US012634426B2

(12) United States Patent
Zhang

(10) Patent No.: US 12,634,426 B2
(45) Date of Patent: May 19, 2026

(54) PERFORMANCE TESTING FOR STEREOSCOPIC IMAGING SYSTEMS AND ALGORITHMS

(71) Applicant: Nvidia Corporation, Santa Clara, CA (US)

(72) Inventor: Jack Yusong Zhang, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 18/603,916

(22) Filed: Mar. 13, 2024

(65) Prior Publication Data

US 2025/0294129 A1     Sep. 18, 2025

(51) Int. Cl.
  *H04N 13/239*     (2018.01)
  *H04N 13/00*     (2018.01)
  *H04N 13/296*     (2018.01)
(52) U.S. Cl.
  CPC ......... *H04N 13/239* (2018.05); *H04N 13/296* (2018.05); *H04N 2013/0081* (2013.01); *H04N 2013/0096* (2013.01)
(58) Field of Classification Search
  CPC ............... H04N 13/239; H04N 13/296; H04N 2013/0081; H04N 2013/0096; H04N 13/246

USPC .......................................................... 348/47
See application file for complete search history.

(56) References Cited

U.S. PATENT DOCUMENTS

2013/0293726 A1* 11/2013 Armstrong-Muntner ...................
                                      G01N 21/958
                                      348/187
2020/0228783 A1*  7/2020 Zhao ..................... H04N 13/239

* cited by examiner

*Primary Examiner* — Susan E. Hodges
(74) *Attorney, Agent, or Firm* — Hogan Lovells US LLP

(57)     ABSTRACT

Approaches presented herein provide for the testing of imaging algorithms and systems. In at least one embodiment, a stereoscopic test pattern can be obtained that includes a number of features that vary in width and separation, such as may comprise a set of radial elements that converge toward a center point. A stereoscopic image of an instance of the pattern can be analyzed, such as at a set of radial positions, to make various measurements, including a limit on the ability to distinguish between different features. A pair of synthetic images of the pattern can be generated in order to test aspects of a stereoscopic algorithm used to generate stereoscopic images, with such testing being separate from the physical system, and a physical object can be generated that includes a representation of the pattern in order to be able to test the physical stereoscopic imaging system.

20 Claims, 21 Drawing Sheets

200

210

306

302

300

304

Left    320

Right    340

Disparity    360

Stereoscopic    380

500

502 — Generate a synthetic stereoscopic test pattern with coarse features converging into fine features 504 — Generate, for a determined offset, a synthetic left image and a synthetic right image corresponding to the synthetic test pattern 506 — Generate, using a stereoscopic algorithm with the synthetic left and right images, a stereoscopic image with pixel values indicating depth 508 — Analyze the test pattern in the stereoscopic image at each of a plurality of concentric circles (or other curves) to determine parameter values with respect to the pattern features 510 — Calculate, based in part upon the parameter values, a feature size at which features are no longer distinguishable / determinable with at least a minimum confidence or certainty 512 — Provide information associated with the feature size as a resolution limit of the stereoscopic algorithm 514 — Optionally perform additional measurement(s) using the test pattern represented in the stereoscopic image

FIG. 5A

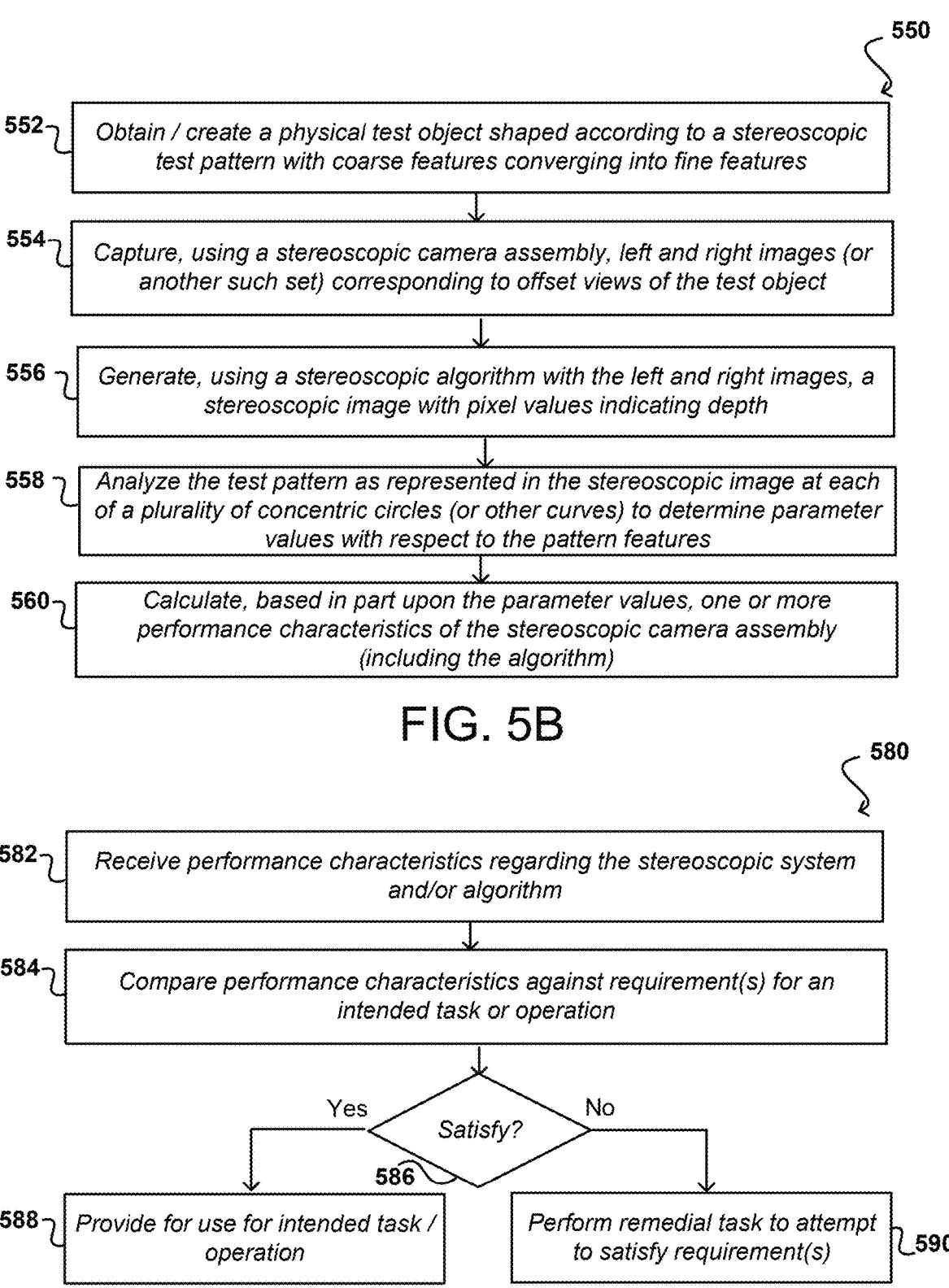

550

552 — Obtain / create a physical test object shaped according to a stereoscopic test pattern with coarse features converging into fine features 554 — Capture, using a stereoscopic camera assembly, left and right images (or another such set) corresponding to offset views of the test object 556 — Generate, using a stereoscopic algorithm with the left and right images, a stereoscopic image with pixel values indicating depth 558 — Analyze the test pattern as represented in the stereoscopic image at each of a plurality of concentric circles (or other curves) to determine parameter values with respect to the pattern features 560 — Calculate, based in part upon the parameter values, one or more performance characteristics of the stereoscopic camera assembly (including the algorithm)

582 — Receive performance characteristics regarding the stereoscopic system and/or algorithm 584 — Compare performance characteristics against requirement(s) for an intended task or operation Yes     Satisfy?     No
586

588 — Provide for use for intended task / operation

Perform remedial task to attempt to satisfy requirement(s) — 590

DATA CENTER
800

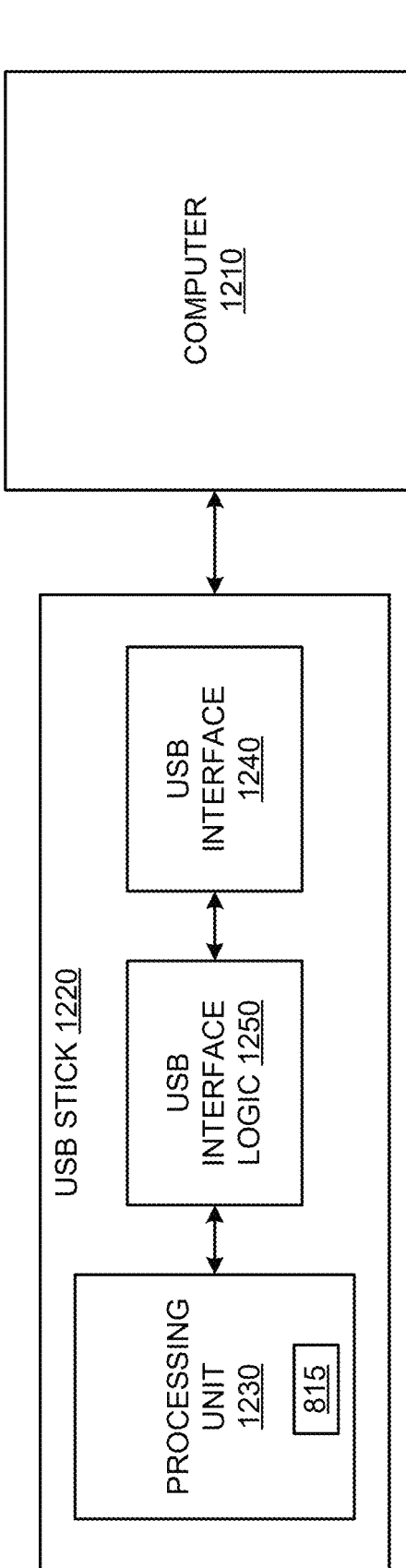
FIG. 12

GRAPHICS
PROCESSOR
1410

VERTEX PROCESSOR
1405

614

FRAGMENT
PROCESSOR
1415A

614

FRAGMENT
PROCESSOR
1415C

614

FRAGMENT
PROCESSOR
1415N-1

614

FRAGMENT
PROCESSOR
1415B

614

FRAGMENT
PROCESSOR
1415D

614

FRAGMENT
PROCESSOR
1415N

614

MMU
1420A

MMU
1420B

CACHE
1425A

CACHE
1425B

INTERCONNECT
1430A

INTERCONNECT
1430B

GRAPHICS
PROCESSOR
1440
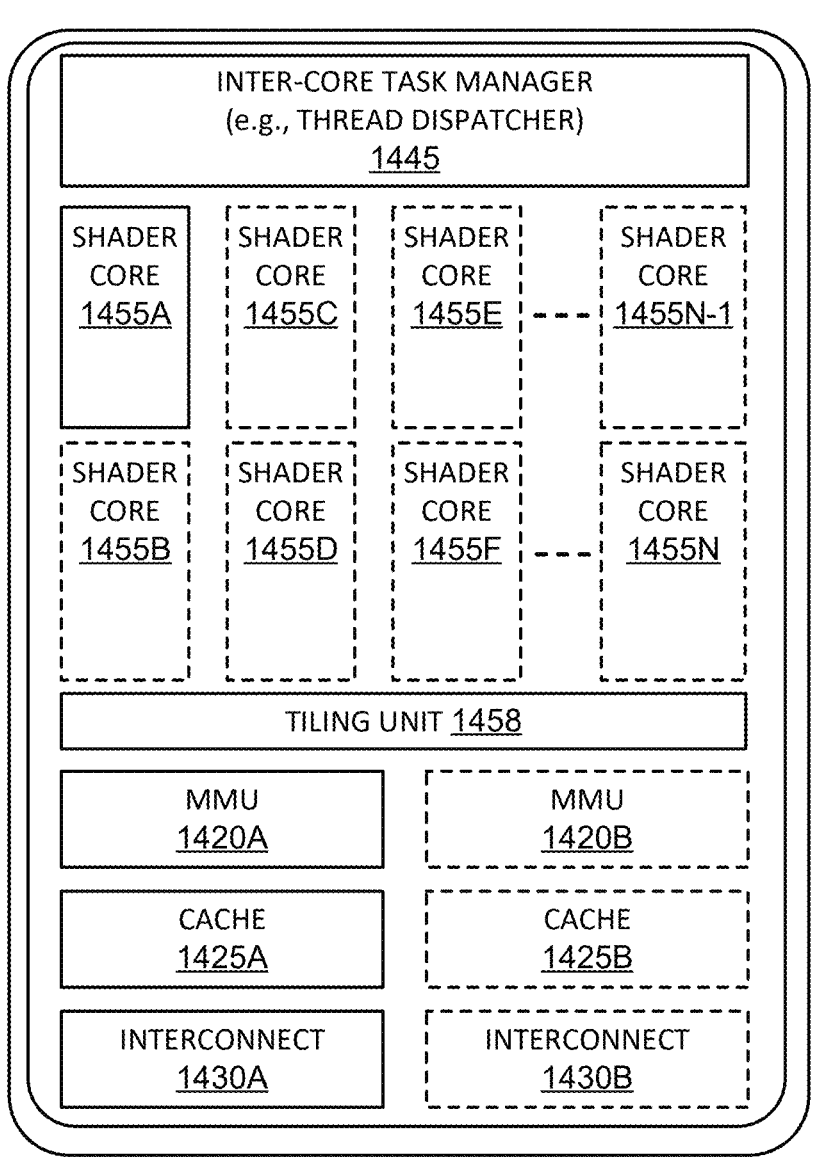
FIG. 14B

PERFORMANCE TESTING FOR STEREOSCOPIC IMAGING SYSTEMS AND ALGORITHMS

BACKGROUND

There are various operations—as may relate to robotics or autonomous navigation—that use computer vision to determine the locations of objects in an environment, which can allow for accurate interaction with certain objects while avoiding unintended interactions or collisions with other objects. For image-based systems, an approach such as stereoscopic imaging can be used to be able to determine distances to objects represented in captured image data. Stereoscopic imaging typically involves analyzing the differences in location of an object represented in two or more images captured from slightly different locations representing slightly different views of the object, with the typical stereoscopic output being a depth image where each pixel corresponds to a pixel in one image, such as a "left" image, but the value of the pixel represents the depth of the object (or distance from the camera) at that location, and not the color of the object as in traditional images. Whereas traditional imaging approaches have many tests available to characterize an imaging system, producing various quality metrics, there are few such approaches for stereoscopic imaging, which can negatively impact the quality of the imaging system and reduce the benefit of its use for various operations. Further, the few tests that exist for stereo imaging systems do not support various types of testing of the stereoscopic algorithm separate from the physical imaging system.

BRIEF DESCRIPTION OF THE DRAWINGS

Various embodiments in accordance with the present disclosure will be described with reference to the drawings, in which:

FIG. 5A illustrates an example process that can be performed to determine the resolution of a stereoscopic algorithm, according to at least one embodiment;

FIG. 5B illustrates an example process that can be performed to determine performance parameters of a stereoscopic system, according to at least one embodiment;

FIG. 5C illustrates an example process that can be performed to use performance measurements to determine whether actions should be taken with respect to a stereoscopic imaging system or algorithm, according to at least one embodiment;

FIG. 12 illustrates a computer system, according to at least one embodiment;

FIGS. 14A and 14B illustrate exemplary integrated circuits and associated graphics processors, according to at least one embodiment;

DETAILED DESCRIPTION

Figure 1A:
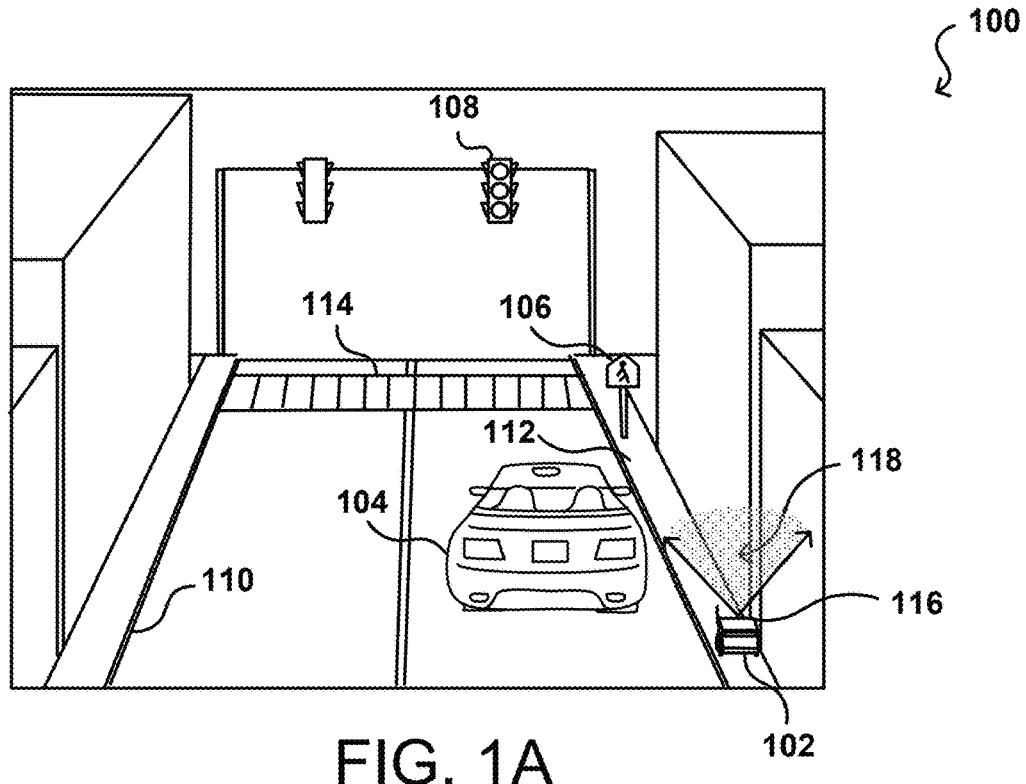
FIG. 1A illustrates the capture of image data for an environment, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles or machines, semi-autonomous or autonomous vehicles or machines (e.g., in one or more advanced driver assistance systems (ADAS), one or more in-vehicle infotainment systems, one or more emergency vehicle detection systems), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, generative AI, model training or updating, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, generative AI, cloud computing, and/or any other suitable applications.

Disclosed embodiments may be comprised in a variety of different systems such as automotive systems (e.g., an in-vehicle infotainment system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models—such as large language models (LLMs), systems for performing generative AI operations (e.g., using one or more language models, transformer models, encoder/decoder models, etc.), systems for performing light transport simulation, systems for performing collaborative content creation for 3D assets, systems implemented at least partially using cloud computing resources, and/or other types of systems.

Approaches in accordance with various illustrative embodiments provide for the testing of imaging systems and/or algorithms used for purposes such as environmental perception. In particular, at least one embodiment takes advantage of a stereoscopic test pattern to determine performance characteristics, such as a resolution limit or sharpness, observed for a stereoscopic imaging system and/or algorithm. A stereoscopic imaging algorithm (or trained model, etc.), used to generate a stereoscopic image from a pair of images at least one object captured from different viewpoints, can introduce imprecision due to aspects of the algorithm, as may relate to interpolation, convolutions, upsampling and downsampling, and the like. A stereoscopic algorithm can be tested independently of the imaging system by using synthetically-generated stereoscopic test data. For example, a stereoscopic test pattern can be used to generate a synthetic stereoscopic image pair, such as a left image and a right image representing the test pattern viewed from different viewpoints corresponding to a predetermined offset between locations of the cameras of a virtual stereoscopic camera assembly. As used herein, a stereoscopic camera assembly will be described as including an offset pair of matched cameras, although other configurations or options can be used as well. The synthetic left and right images can be processed using a stereoscopic algorithm to generate a stereoscopic image, where a given pixel value of the image represents a determined distance to an object point corresponding to that pixel location. To test a physical system including the algorithm, a physical test object can be obtained that includes a representation of the stereoscopic test pattern. Left and right images of the physical test object can be captured by a stereoscopic imaging assembly, and the stereoscopic algorithm can be used to generate a stereoscopic image from these captured left and right images. The stereoscopic image, whether generated using synthetic or captured images, can then be analyzed to have various measurements or parameter values determined.

A stereoscopic test pattern in at least one embodiment can include a number of features of similar size and shape that converge or decrease in feature size over a length of a given feature. This may include, for example, a radial star pattern including a number of features that start as coarse features at a distance from a convergence point and transition to finer features as they converge on a center point of the radial pattern. While an ideal radial pattern may be observed to converge to a center point in at least one embodiment, aspects of various stereoscopic algorithms and imaging systems will introduce errors and/or imprecisions which can cause the features (and spacings between those features) to become indeterminable and/or indistinguishable at some distance before the center point. The distance from the center point at which fine features are unable to be distinguished can correspond to a limit on the resolution of the system and/or algorithm. In at least one embodiment, a set of concentric circles or orbits (or other such curves or locations) can be analyzed with respect to a representation of the test pattern in a stereoscopic image, and the pattern or function of pixel values along each circumference analyzed. As the testing distance approaches the center point of the test pattern, the cycles of features and spacings will at some distance become indistinguishable due in part to their decreasing size, and a curve or function can be fit to the data for these concentric circles in order to determine the point or distance at which features become indistinguishable. A user might set a threshold that occurs before this point or at a slightly greater distance, corresponding to a location or distance where the features may not be distinguishable with at least a minimum certainty, confidence, accuracy, or other such criterion. This can be set as a limit on the resolution or sharpness of the stereoscopic algorithm or imaging system, which can then be used to determine whether a given algorithm or system is appropriate for a certain task given the task requirements, as well as to monitor performance over time in order to determine whether any recalibration or other adjustment may be needed to maintain acceptable performance. Various other parameters of a stereoscopic system or algorithm can be measured as well using such an approach. Such approaches to testing the performance of imaging systems and algorithms can be beneficial for any task where environmental perception or other such tasks may be based in part on the image data, as may relate to robotic operation or autonomous vehicle navigation, among other such options.

Variations of this and other such functionality can be used as well within the scope of the various embodiments as would be apparent to one of ordinary skill in the art of the teachings and suggestions contained herein.

FIG. 1A illustrates a view of an example environment 100 in which a stereoscopic imaging system may be used. In this example, the environment relates to an urban location including a number of roads, sidewalks, and other such objects. A robotic delivery device 102 might operate on the sidewalks, crosswalks, and other locations within this environment 100 in order to perform a specific task or operation, such as to deliver an item from a source location (e.g., a restaurant) to a destination location (e.g., a location of a customer who placed an order for delivery). Such robotic devices can operate in various other types of environments as well, such as factories, warehouses, clean rooms, and research facilities, among other such options. Further, other types of systems, devices, or components can use stereoscopic and/or computer vision approaches for tasks such as navigation and operation as well within the scope of the various embodiments.

In this example, the robotic delivery device 102 includes at least one camera 116 that is able to capture image information about the environment 100, including at least a portion of the environment that is within a field of view 118 of the camera. There may be multiple such cameras and/or other sensors positioned about the robotic delivery device 102 as well in accordance with various embodiments. In this example, the robotic delivery device includes at least one camera 116 on a front of the device, where the "front" corresponds to the direction of motion of the device during normal operation. The camera 116 can capture information about a region of the environment "in front" of the vehicle in order to make informed decisions about how to maneuver through the environment 100. For example, the camera can attempt to capture information about the locations of roads, sidewalks 110, 112, and crosswalks 114 so the device can determine where the device should, and should not, consider potential paths for navigation. The camera can also attempt to capture information about street signs 106, traffic lights 108, and other such objects that can help the device to determine when and where to move along these potential routes. The camera can also attempt to capture information about objects in the scene, such as automobiles 104, pedestrians, cyclists, buildings, mail boxes, and other such objects that the device should attempt to maneuver around in order to avoid any unintended collisions. Algorithms executing on the device can analyze captured image and/or other types of sensor data to obtain various other types of information about the environment 100 as well within the scope of various embodiments.

When attempting to determine the locations of various objects in the environment, it can be difficult to accurately estimate those locations based only on two-dimensional (2D) images that do not include depth information. If depth information is available, such as by using a LIDAR system, the depth information will still need to be correlated with objects represented in the captured image data. Accordingly, at least some devices or approaches use cameras that capture depth data, or capture image data that can be used to determine depth or distance data. This can include, for example, the use of a stereoscopic camera assembly. A stereoscopic camera assembly (or "stereo camera") typically consists of a set of matched cameras (being of the same type and having as close to the same camera parameters are possible) that are offset by a known distance, but focused in essentially the same direction or to a single point at infinity (or at a distance that is appropriate for a given task or operation, such as the maximum distance across a warehouse floor, etc.). Each camera will capture an image of the environment at the same time, or approximately the same time, in order to avoid the representation of temporal differences between the images. Because the two cameras are offset, the views of objects represented in the images will be slightly different. The differences in locations of similar points on objects in the stereoscopic (or "stereo") images is known as disparity data. Objects closer to the cameras will exhibit a greater amount of disparity, or difference in location in the stereo images, while objects further away will exhibit a lesser amount of disparity. By testing and calibrating the camera system, an algorithm can determine how far away an object is from the camera by calculating the disparity associated with the object (such as an average disparity for at least edge points of the object) in a stereoscopic image of the object, and determining the corresponding distance for that amount of disparity when represented in images captured by this particular camera. Such an approach thus allows for the calculation of three-dimensional (3D) location determinations using a pair of 2D images. Instead of pixel values representing color as in a conventional image, a stereoscopic image, generated by analyzing the two individual 2D images) can have pixel values that instead represent distance from the camera.

Figure 1B:
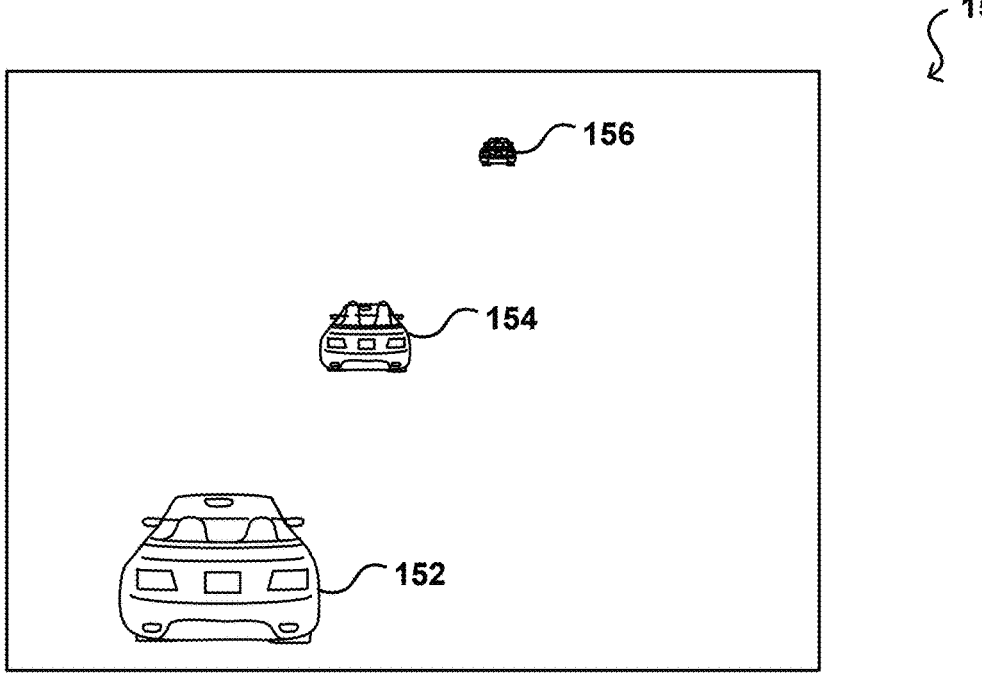
FIG. 1B illustrates objects at different distances or with different sizes, that can be represented in image data, according to at least one embodiment.

As illustrated in the collection of objects 150 in FIG. 1B, objects will appear smaller at greater distances from the camera. For example, the same type of vehicle appears larger for a first instance 152 than at other instances 154, 156 that are further away, even though the actual sizes of each of these cars is the same. As mentioned, the amount of disparity will also decrease as the objects are further away from the camera. As illustrated in FIG. 1B, there will be some distance—such as the distance of the third instance 156 of the vehicle—where the representation of the object will be so small that it will be difficult to identify features of the object, such that an accurate determination of the type of vehicle may no longer be made with at least a minimum level of confidence. Thus, there may be a maximum distance at which the image data may be reliable for object detection. Similarly, the disparity data will get increasingly smaller in value as the objects are further away from the camera. At some distance, the disparity data will become so small that the difference values may no longer be reliable, or the corresponding points no longer distinguishable between the two stereoscopic images. This can be exacerbated by the actual algorithms that are used to determine the disparity data. For example, a neural network might involve one or more convolutions that perform averaging and/or kernelling, and may perform some amount of upsampling and/or downsampling that can impact the resolution. Further, an algorithm might perform tasks such as smoothing, interpolation, noise reduction, anti-aliasing, filtering, or other such processing, which may impact the precision of the disparity data, even beyond limitations of the image resolution or camera quality. Thus, there can be limitations in the resolution of stereoscopic imaging systems, such that objects beyond a determined distance cannot have their distance calculated with at least minimum confidence or certainty, but there can also be similar limitations in the algorithms (or models or processes, etc.) used to calculate disparity or distance data from these captured images.

Approaches in accordance with at least one embodiment can attempt to determine the resolution of stereoscopic imaging systems and, together or independently, stereoscopic image processing algorithms (or other such techniques). This can involve the use of one or more test patterns and/or targets that are generated based on their applicably to stereoscopic imaging. In particular, one or more test patterns can be used that have features of decreasing size and/or separation, which can provide for accurate measurements of metrics such as resolution or sharpness of a stereoscopic imaging system. Such a target can also be used to measure the resolution of a stereoscopic algorithm independent from the individual camera characteristics.

Figure 2A:
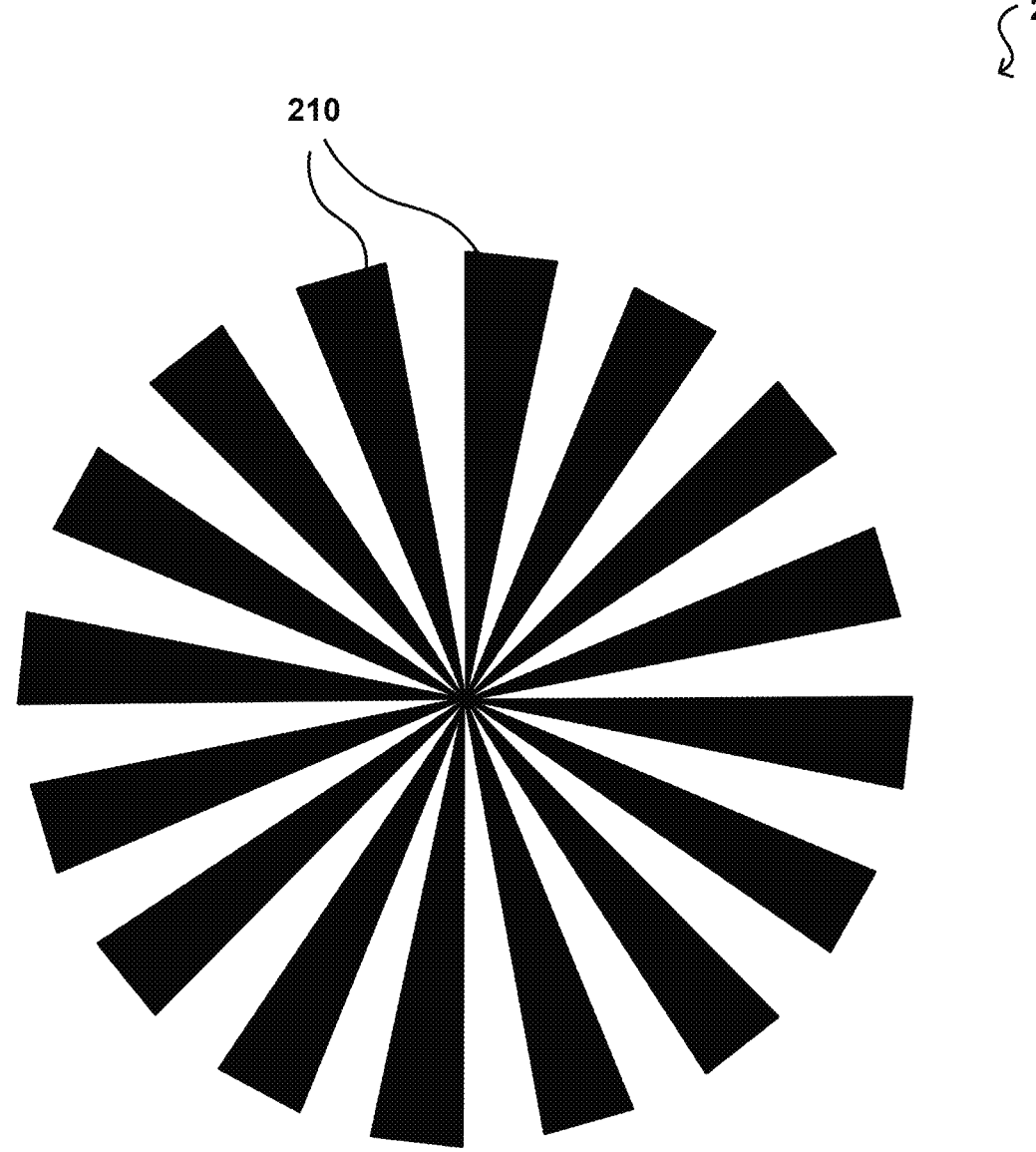
FIG. 2A illustrates an example stereoscopic test pattern, according to at least one embodiment.

FIG. 2A illustrates an example stereoscopic test pattern 200 that can be used in accordance with at least one embodiment. There may be multiple versions of such a pattern, such as a synthetic version used to test an algorithm and a physical object having a representation or instance of the pattern to test physical stereoscopic systems, among other such options. A synthetic test target corresponding to the example test pattern 200 can be a two-dimensional (2D) target rather than a 3D target or physical target. The use of such a 2D target can allow testing to be performed that is independent of hardware and environmental noise, for example, which can allow the performance of the algorithm to be more accurately tested. The example test pattern 200 illustrated in FIG. 2A, includes a set of similar features 210 arranged in a radial fashion that start with a similar separation at an outer dimension and then decrease in size and separation while converging to a single point. Such an arrangement of similar features 210 allows for testing of the resolution of a stereoscopic algorithm, as at some point moving towards the convergence point it will not be possible to distinguish between the various features, or their separation, providing a limit on the resolution of the system. The example test pattern 200 illustrated in FIG. 2A includes sixteen such features or cycles of consistent size, that all converge to a central point, as a type of star test image. It can be advantageous to include a limited number of features, as a large number of small features may result in optical artifacts or other unintended image features that may limit or impact the ability to accurately measure resolution. An example test pattern may have various other aspects as well, as discussed and suggested elsewhere herein.

Figure 2B:
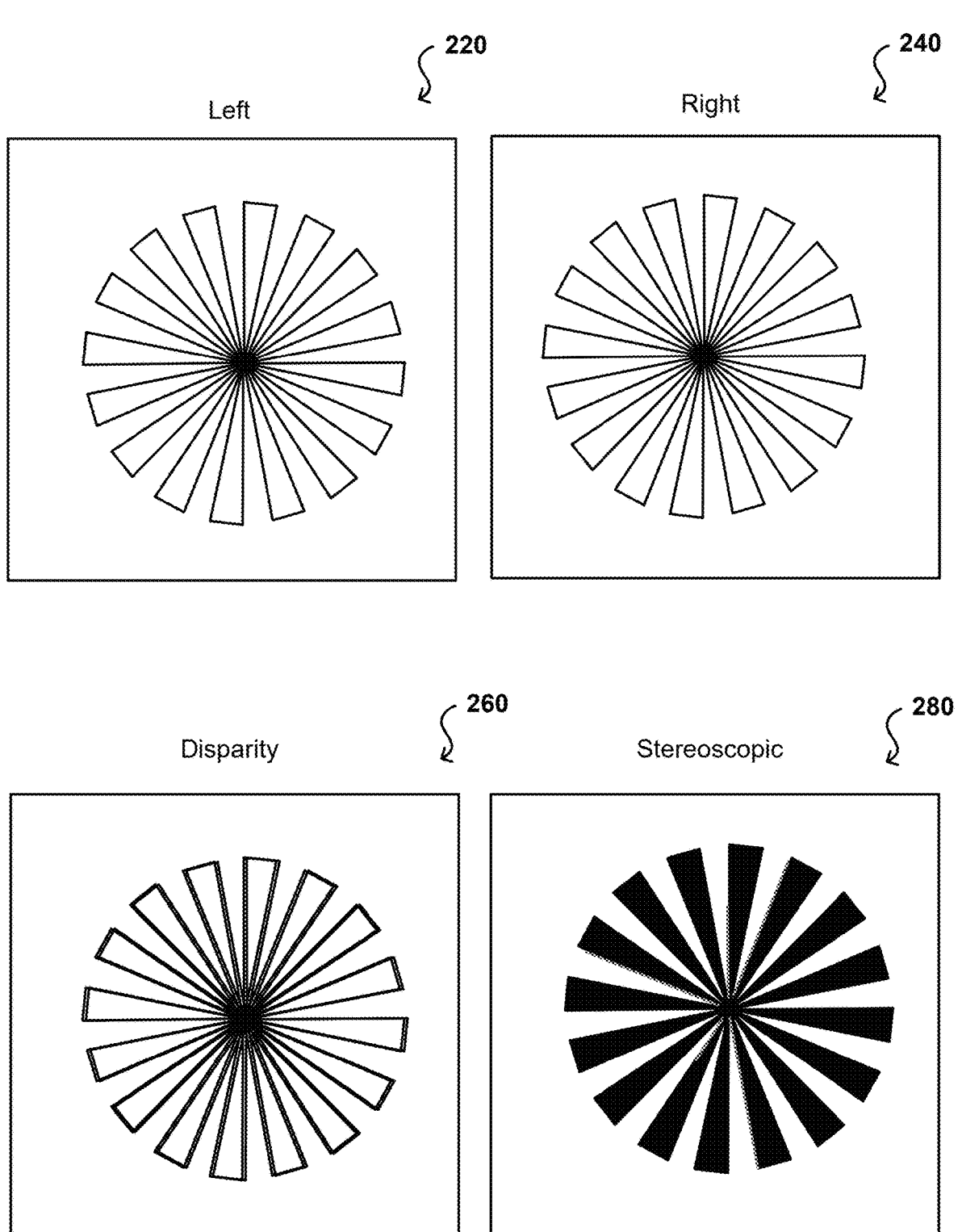
FIG. 2B illustrates synthetic images that can be generated using a synthetic test pattern, according to at last one embodiment.

In at least one embodiment, such a test pattern 200 can be used to generate a set of synthetic images, such as those as illustrated in FIG. 2B. As mentioned, a stereoscopic image typically includes two offset images, such as a left image 220 and a right image 240, that can be combined (or otherwise analyzed or compared) to generate a stereoscopic image that is representative of distances to one or more objects. As illustrated in an example disparity image 260, the offset between the position of the test pattern in the left and right images can be determined through an overlay or comparison, where the amount of disparity in the left/right direction provides an indication of the distance to the test pattern, as the two images, such as the left image 220 and the right image 240, represent views of a test pattern from slightly different positions or viewing angles (e.g., offset horizontally by some amount). In many embodiments such a disparity image would not be generated, but is shown here for purposes of illustration. A stereoscopic image 280 can be generated, using a stereoscopic algorithm with the left and right synthetic images, that is generated based on the differences (e.g., disparity) between the position of the test pattern represented in the left image 220 versus the right image 240. The generated stereoscopic image 280 will not be perfect, and will have variations, artifacts, defects, or other limitations or aspects introduced through parts of the algorithm discussed elsewhere herein, as may relate to smoothing, noise reduction, and the like.

Once generated, the stereoscopic image 280 can be analyzed to calculate or otherwise determine one or more parameters of the algorithm, such as the resolution. In the generated stereoscopic image, instead of the features converging nicely to a single, center point, the image will appear to have a center circular feature of a finite size with a relatively consistent value for the relevant pixel positions. The resolution of the algorithm can be associated with this central circular feature, either at the edge or at some distance near the circular feature edge. The performance of the algorithm can not only be determined by analyzing the generated stereoscopic image itself, but also by comparing the generated stereoscopic image against a synthetic ground truth image generated using the synthetic left and right images. Because the images are generated synthetically for a known object at an identified distance or offset, with a known relative orientation of the virtual stereoscopic cameras, the ground truth image can be a highly accurate representation of the stereoscopic image that would be expected for the left and right images, and can thus serve as a type of ground truth for testing a stereoscopic algorithm, model, or process. Such a set of synthetic test images can be used to measure the stereoscopic characteristics of a stereoscopic imaging system. Multiple test images can be used in at least one embodiment, with different test patterns, in order to reduce the influence of texture and feature correspondence on the measurements.

In at least one embodiment, a test pattern may include features that correspond to a square wave of a determined resolution (in cross-section), with settings such as a background disparity of 10, a star disparity of 100 (0.82 contrast), with high RBG and luma contrast settings. Such a pattern can allow for measurement of various metrics, as may include (without limitations) the normalized contrast as a function of frequency, the modulation transfer function (MTF)—a measure of sharpness and/or resolution, the accuracy as a function of frequency (e.g., the root mean square error (RMSE), the total RMSE, among other such metrics. In at least one embodiment, given that the contrast curves can be low noise, some embodiments may use MTF 10 as a resolution limit, where the MTF 10 values may be measured against multiple targets and the minimum value selected. As textures can still have an effect, it can be desirable in at least one embodiment to attempt to minimize the effect or impact of such textures on the measurement process. Such an approach can advantageously be used to test for performance on different textures in at least some embodiments. An additional advantage of using a 2D test pattern is that such a pattern can be synthesized with very precise specification, as well as to synthesize the corresponding ground truth image(s). The various parameters can be modified independently, and such a pattern allows for a pure left/right (or other pair or set of images) correspondence test to be performed. If 3D test patterns were to be used, there may be the need for ground truth annotation and it can be harder to generate to precise specifications, with parameters being more correlated and difficult to independently modify.

In at least one embodiment, a stereoscopic algorithm test can begin by selecting or generating an appropriate test pattern, including features such as those illustrated in FIG. 2B. A set of synthetic images can be generated using the test pattern, including left and right images with a determined offset, as well as a ground truth image illustrating the pattern at the determined distance corresponding to that disparity or determined offset. The stereoscopic algorithm can take the left synthetic image and the right synthetic image as input, and can generate a corresponding stereoscopic image. The stereoscopic image can then be compared against the synthetic ground truth image to determine accuracy, and differences can be used to train and/or fine-tune a model or algorithm used to determine disparity information and generate stereoscopic images from the input left and right images. The use of synthetic image data allows for testing the stereo algorithm independent of any inaccuracies or limitations of the physical imaging system.

Figures 3A, 3B:
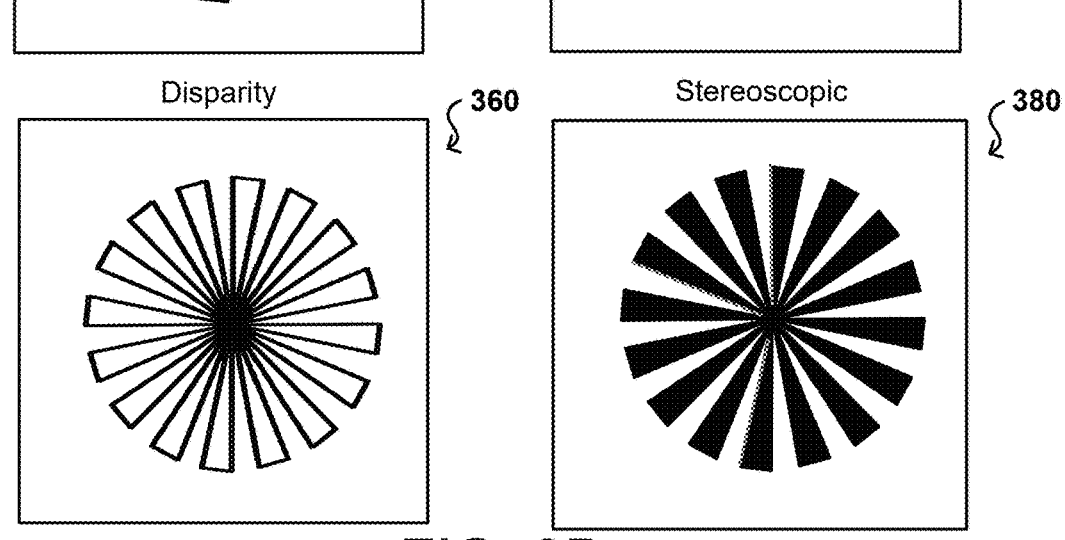
FIG. 3A illustrates a physical stereoscopic test object, according to at least one embodiment.
FIG. 3B illustrates images that can be generated using a stereoscopic imaging system, according to at least one embodiment.

As mentioned, such patterns can be used to test physical stereoscopic imaging systems as well within the scope of various embodiments. As an example, FIG. 3A illustrates a physical test target 300 corresponding to a stereo test pattern that can be used according to at least one embodiment. Such a physical test target 300 can be a three-dimensional (3D) test target that is used to perform measurements for actual stereoscopic systems, rather than for the algorithms that may be used by those systems. This can include performing measurements associated with the actual hardware used in the systems. In at least one embodiment, a physical test target is an object having a determined 3D shape that is selected to test one or more specific aspects of a system, such as the system resolution, using a measurement methodology involving additional factors that do not apply to traditional measurements of conventional imaging systems. A physical test target can allow for testing of systems including the underlying stereoscopic algorithm. There can be a tradeoff versus the use of synthetic images to test the algorithm, however as use of such a target can introduce the presence of environmental and hardware effects. Further, it may prove challenging to independently modify parameters of such a physical target, and can involve more effort to generate ground truth data than for a synthetic 2D test pattern.

In one example, a physical test target 300 can be used that is similar to the 2D test pattern of FIG. 2A, in that it includes sixteen bars, cycles, or features 302 of similar shape and size that all converge (or are shaped to appear to converge) to a single point 304 in a radial pattern. A physical instance of this example pattern has an outer diameter of 20 inches, an inner diameter of 0.5 inches, and a 21 inch total diameter. A 4 mm mounting hole 306 is included for rigidly mounting to a mounting apparatus for testing, with the target formed from a sheet of aluminum of $\frac{1}{16}$ of an inch in thickness. The surface finish can vary by system, as may be based upon environmental conditions, intended use, or other such factors.

Generating ground truth data for an imaging system based on captured images of real objects can be more complicated and less precise than when using synthetic images. Aspects of the ground truth data can depend upon the setup, such as the camera configuration and the location and/or orientation of the test object. There may also be variations in performance of the imaging system itself that can lead to variations in ground truth. An advantage of using synthetic data is that the ground truth does not change over time based on these or other such factors.

A physical test object 300 such as that illustrated in FIG. 3A can be placed or mounted a given distance from a stereoscopic camera, and the stereoscopic camera can capture a pair of images, such as a left image 320 and a right image 340 as illustrated in FIG. 3B. These images can be analyzed to determine the disparity data 360 for various points in the images, which can then be used to generate a stereoscopic image 380 wherein the pixel value represents the distance to the object. As illustrated, there will be some imprecision due in part to the physical limitations of the camera apparatus, such that the stereoscopic image 380 will not represent a perfect test pattern. As illustrated, there will be some point towards the center of the pattern where the features become indistinguishable and appear to become a type of circular pattern near the center of the pattern. It is around the end of this apparent circular region where the features become indistinguishable where the resolution limit of the camera can be determined to exist, at least under current conditions.

Figure 4A:
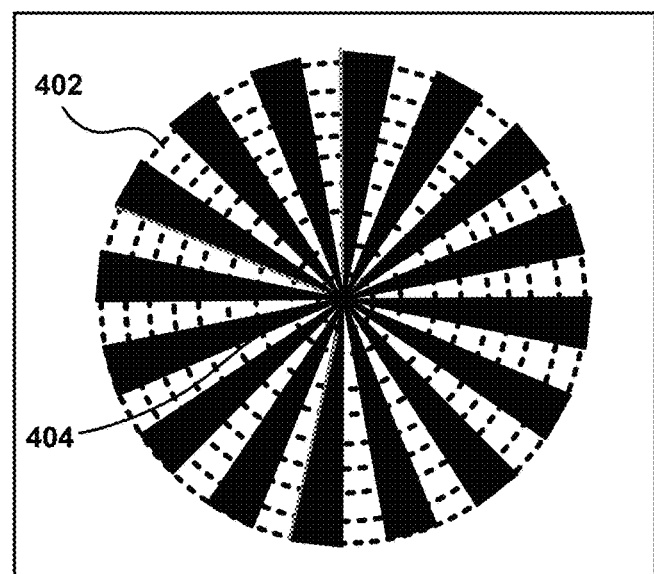
FIG. 4A illustrates a set of testing curves that can be used to analyze a generated stereoscopic image, according to at least one embodiment.

It can then be beneficial, in at least some embodiments or implementations, to attempt to determine one or more values or metrics corresponding to this limit on camera resolution. Such a measurement can be used to determine, for example, a resolution limit of a stereoscopic camera system. One approach to making such measurements is to analyze a set of concentric circles (or "orbits" as they will often be at least somewhat irregular in shape), of different diameter, and measure various aspects of the pattern, as illustrated in the example view 400 of FIG. 4A. For an outer test circle 402 or ring, for example, this might include analyzing variations in contrast between the foreground pattern and background for points along the circumference. The curve defined by those contrast variations can be analyzed to determine the location of the rising and falling edge of each feature, where the features when viewed along such a circle appear like a square wave with steep leading edges, up to a specific height that is maintained, then a steep falling edge, down to a background distance value. As mentioned, the shape will not be a true square wave due in part to imprecision in the imaging system and the stereoscopic algorithm, as well as environmental factors and other such concerns. An approximate (e.g., average or mean) location of each edge position can be calculated for each feature in each of the right and left images. Values such as a feature frequency or resolution at that circle location can be calculated, based on a value determined for all features in that image at that circle location. This process can be repeated for each concentric circle location with respect to the stereoscopic image 400.

Figure 4B:
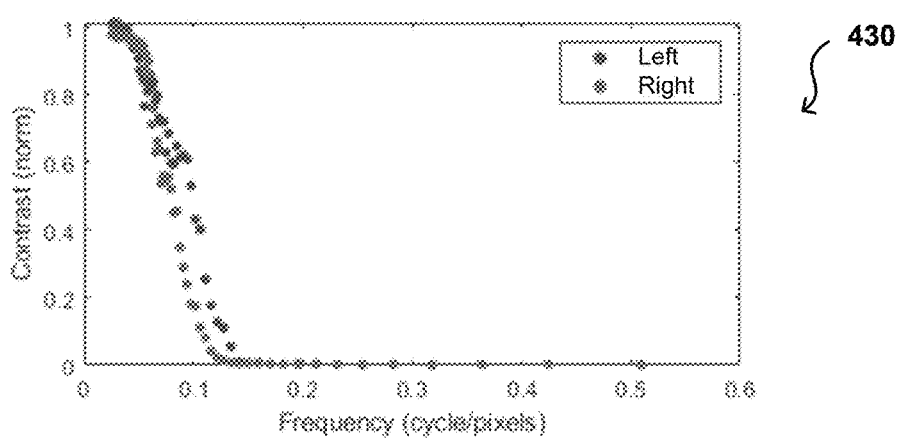
FIGS. 4B and 4C illustrate plots of parameters determined from a set of testing curves applied to a stereoscopic image of a test pattern, according to at least one embodiment.
Figure 4C:
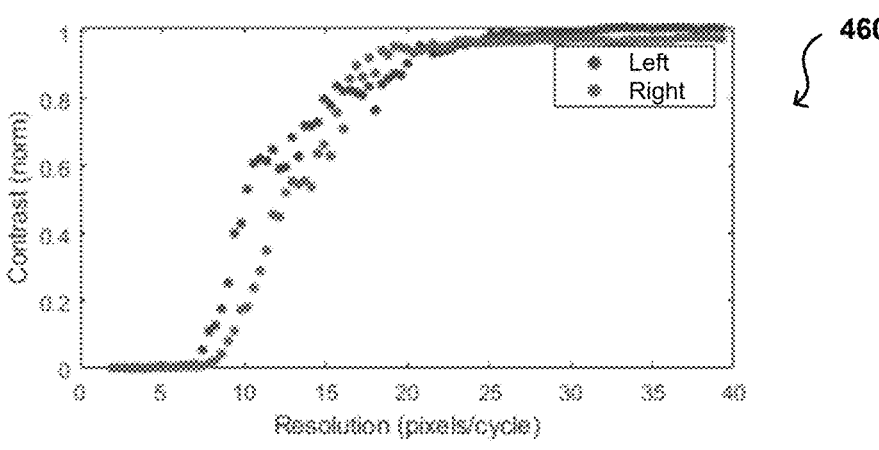

The values determined for the pair of images at these locations can then be plotted, such as by using a frequency plot 430 as illustrated in FIG. 4B, or a resolution plot 460 as illustrated in FIG. 4C. The resolution (in pixels per cycle) and frequency (in cycles per pixel) are inverses of each other, used to illustrate different views of the same data. A cycle in this example can correspond to a feature and an adjacent spacing in the test pattern. For a pattern with 16 features, there will be 16 cycles, and each concentric circle will have a number of pixels in that circumference, arriving at a number of pixels per cycle for a given concentric circle. Such an approach can provide a measure of sharpness, similar to that provided when measuring Modulation Transfer Function (MTF) as discussed elsewhere herein, but is based on the stereoscopic imaging process rather than a hardware-based transfer function.

As discussed, there will be at least one circle or orbit location 404 for which the features are no longer able to be differentiated. This location can correspond to specific values in the frequency and resolution plots, as well as plots for other such values. For example, it can be seen that near a frequency of 0.2 cycles per pixel there is almost no detectable contrast. Similarly, at a resolution of less than about 7 pixels per cycle there is also almost no detectable contrast. While plots are shown for illustration purposes, it should be understood that such data can be analyzed mathematically without actually generating plots in various embodiments. Using such data, the values of various metrics (e.g., resolution or sharpness) can be determined, as well as the values at which those metrics are no longer reliable. The reliability also may be adjustable in various embodiments. For example, the resolution of a system may not be limited to that distance where features are no longer distinguishable, but may be at a distance where the feature size and/or separation is below a specified threshold. This threshold can be adjusted to balance being able to detect and identify a higher number of objects with a potential decrease in the accuracy of those identifications.

In at least one embodiment, the variations in contrast corresponding to different distance values along a given circumference can take a form similar to that of a step function or sine wave, depending in part upon the type of feature used. If bar-shaped features are used with well-defined edges, then the pattern may approach a cyclical step function that alternates between a low distance value and a high distance value, with some potential variation or imprecision along the edges or transitions of the step function. For synthetic images, the algorithmic output can be compared against the patterns produced at the same orbit location with respect to the ground truth image. The transitions can also be analyzed to determine when they would pass below the pixel barrier in spacing, as well as when they become indistinguishable or unreliably distinguishable, among other such metrics, criteria, or thresholds presented herein.

FIG. 5A illustrates an example process 500 that can be performed to determine parameters such as the resolution of a stereoscopic algorithm, in accordance with at least one embodiment. It should be understood that for this and other processes presented herein that there may be additional, fewer, or alternative steps performed or similar or alternative orders, or at least partially in parallel, within the scope of the various embodiments unless otherwise specifically stated. Further, although this and other examples herein will be discussed with respect to resolution and stereoscopic imaging, there can be other types of parameters and measurements determined for other types of imaging or sensor-based systems or algorithms as well, within the scope of various embodiments. In this example, a synthetic test pattern can be generated 502 that includes a plurality of coarse features that converge into fine features. As discussed, this may include a radial star-type pattern with a determined number of features of a common width that converge towards a central point of the pattern, among other such options. A determined offset can be used with this synthetic test pattern to generate 504 a synthetic left image and a synthetic right image, with differing views of the test pattern generated according to the offset (in this case a lateral, horizontal offset, but other offsets can be used as well in other embodiments). A stereoscopic algorithm that is being tested can then be used to generate 506, using the synthetic left and right images, a stereoscopic image with pixel values indicating depth of the corresponding points of the test pattern. The test pattern represented in the generated stereoscopic image can be analyzed 508 at each of a plurality of concentric circles (or other such curves, functions, or locations) to determine parameter values with respect to the pattern features. This may include, for example determining the pixel values along the circumference of each concentric circle, and determining information and/or measurements about the cycles (e.g., features and spacings) represented in that circumference. In this example, these parameter values can be used to calculate 510 at least a feature size at which features and/or spacings are no longer distinguishable or individually determinable from the stereoscopic image with at least a minimum level of confidence or certainty. This may include, for example, performing curve fitting for the data points from the concentric circles and then applying a confidence or certainty threshold, which can correspond to a determined limit of the resolution of the stereoscopic algorithm. Information associated 512 with this minimum feature size and/or resolution limit of the stereoscopic algorithm can then be provided for use for various purposes, such as to select an appropriate algorithm for a given task based in part upon satisfying one or more resolution requirements for the task. One or more additional measurements can also be performed 514 using the generated stereoscopic image, which can also provide indication of the performance capabilities or limitations of the respective stereoscopic algorithm.

FIG. 5B illustrates an example process that can be performed to determine parameters such as the resolution of a stereoscopic imaging system, in accordance with at least one embodiment. In this example, a physical test object is generated and/or obtained 552 that is shaped in accordance with a stereoscopic test pattern that has a number of coarse features that converge into fine features, such as in a radial test pattern where similarly sized and shaped features converge toward a central point of the object. A stereoscopic imaging assembly can be used to capture 554 left and right images (or other pairs or sets of offset images) corresponding to offset views of the test object. A stereoscopic test algorithm can be used, with the left and right images, to generate 556 a stereoscopic image with pixel values indicating the depth of points on (or off) the object with respect to the location of the stereoscopic camera. The test pattern as represented in the stereoscopic image can be analyzed 558 at each of a plurality of concentric circles (or other curves or locations) to determine one or more parameter values (e.g., minimum resolvable feature size) with respect to the pattern features. One or more performance characteristics (e.g., resolution limit) of the stereoscopic imaging assembly (including the stereoscopic algorithm) can then be calculated 560 that can be used to determine whether a given system is sufficient for a specific task, or whether performance has degraded and maintenance or recalibration may be needed, among other such options.

FIG. 5C illustrates an example process 580 for making determinations based in part upon one or more performance characteristics determined for a stereoscopic imaging assembly and/or algorithm in accordance with at least one embodiment. In this example, one or more performance characteristics are received 582 regarding a stereoscopic system and/or algorithm. The characteristic(s) can have been determined using a stereoscopic test pattern as discussed herein, using a process such as that discussed with respect to FIG. 5A or 5B. The performance characteristic(s) can be compared 584 against one or more requirements for an intended task or operation. If it is determined 586 that any applicable requirements are satisfied by the performance characteristics, then the system and/or algorithm can be provided 588 for the intended task or operation, whether for initial or continued use. In some embodiments, the performance characteristics may still satisfy task requirements but are noticed to be degrading in quality over time, such that proactive action may be taken to reduce the risk of not satisfying the requirements in the future. If it is instead determined 586 that at least one performance characteristic does not satisfy a task requirement, then at least one remedial task may be performed 590 to attempt to satisfy the requirement(s), such as to select a different imaging assembly or algorithm, or to make adjustments to the current assembly or algorithm, among other such options.

In at least some instances, the requirements for a task may be based in part on the location or environment in which the task is to be performed. For example, a robot may be tasked with delivering an object across a lab that is only 25 feet wide, across a warehouse that might be 100-200 feet wide, or across a geographical distance that involves highway travel, where it might be required to be able to identify fine features as far as 500 feet away or more. Thus, there may be different algorithms or systems appropriate for the same task based on the environment or context in which the task is to be performed. Similarly, a different approach might be appropriate when operating indoors versus outdoors, among other potential variations. The ability to determine parameters such as resolution limits for stereoscopic algorithms and select an appropriate algorithm (or model, etc.) based in part upon the resolution requirements for a given task was not provided for by prior stereographic imaging system testing approaches. The ability to accurately test systems and algorithms and select the appropriate options can help to reduce costs, latency, and resources that might otherwise be needed if multiple attempts were otherwise needed to be made to arrive at an acceptable selection and configuration.

In one example, it might be determined that the features become unreliably indistinguishable when the cycle length (distance between leading edges of features, including their separations) is seven pixels or fewer. This can be interpreted as a limitation on the imaging system, such that if it is desired to be able to accurately identify a certain type of feature or object, that feature or object may need to be at least seven pixels wide (including spacing from other features or objects). Since aspects of the imaging system are known, this pixel size can be translated into a physical size limit. This can correspond to a distance limit, such as where the disparity falls below this threshold, as well as a physical object limit based in part upon the distance to the camera. So, for example, if a robot is to interact with an object that is a foot wide, then based on the size limit in the stereo image a determination can be made as to the maximum distance away from the camera that the object can be before the robot can accurately and reliably identify the object. If the object is in an environment where the object might be further away from the object than this distance, a different stereo algorithm or imaging system might be used that has a higher resolution or sharpness, and is able to identify the object over the necessary distance range.

Figure 6:
FIG. 6 illustrates an example system for capturing or generating stereoscopic image data, and testing performance of such operations, according to at least one embodiment.

FIG. 6 illustrates an example imaging and control system 600 that can be used in accordance with at least one embodiment. In this example, the control system 600 includes a stereoscopic imaging assembly, which includes a capture device 602 having a pair of matched cameras 604, 606 that have a known offset with respect to each other and are similarly calibrated. The cameras 604, 606 can capture images of one or more objects in a nearby environment 608 from slightly different points of view, with the differences in positions of points of the object(s) between the left and right images providing a measure of disparity or distance to those points with respect to the cameras 604, 606. In this example, a stereo image generation module 610 is illustrated to receive the left and right images from the stereoscopic imaging assembly, but in some embodiments the stereo image generation module 610 can be included as part of the stereoscopic imaging assembly. The stereo image generation module 610 can use a selected algorithm or model, such as from a repository 612 or appropriate algorithms or trained models, and can generate a stereoscopic image from the left and right images. As discussed herein, the pixel values of the stereoscopic image can represent distance to the object points corresponding to those pixel locations. As mentioned, there may be various limitations of the physical stereoscopic imaging assembly that may impact the resolution, sharpness, or other quality parameter of the generated stereoscopic image. Similarly, the algorithm or machine learning model used to generate the stereoscopic image may also have functionality (e.g., interpolation or upsampling, among others) that may impact at least one quality parameter of the generated stereoscopic image. In this example, the stereoscopic image may be provided to an analysis and/or control module 616, that can use the stereoscopic image data to generate one or more instructions to be provided to a physical device 620. This may include, for example, generating a navigation or operation command to be provided to a robotic assembly in order to properly interact, or avoid interaction, with one or more objects whose position is determinable from the stereoscopic image data. In some embodiments, the stereoscopic imaging assembly may be part of, or connected to, the physical device 620, such as where a robot has a built-in stereoscopic imaging system. In order to determine a performance quality of the stereoscopic imaging system and/or algorithm, a stereoscopic image can be generated (conventionally, synthetically, or otherwise as discussed herein) that includes a representation of a stereoscopic test pattern. This stereoscopic image can be provided to a testing module 614, which can calculate one or more performance criteria for the stereoscopic imaging system and/or algorithm as discussed herein. Results of the testing may be provided to a client device 618, for example, which can provide information to a user indicating whether the performance characteristic(s) satisfy one or more operational criteria or requirements for a task to be performed by the physical device 620. If the criteria are not satisfied then a user may select or instruct at least one action to be taken, such as to select a different algorithm or perform a recalibration of the imaging assembly, among other such options discussed and suggested herein. When using such a system to capture actual image data, the actual image data captured will be at least somewhat different for each system based in part upon variations in the physical configuration. Further, there may be subtle (or not so subtle) differences in texture, lighting, background, and other such factors that can impact the quality of the images, and thus the instantaneous resolution and other parameters, although in many instances such factors may have little impact on overall performance.

Certain prior approaches attempt to measure metrics for various errors in a generated depth image, but these approaches do not provide metrics for aspects such as the resolution of a stereoscopic system or algorithm. Whereas testing for conventional images looks at the ability to faithfully reproduce a color image, stereoscopic testing attempts to correlate features in two different images. A test can attempt to determine one or more measures of the sharpness or resolution of such correlation in stereoscopic images. Prior tests for stereoscopic imaging systems generally relate to the performance of the hardware itself, including testing physical aspects of the lenses, camera system, image signal processing hardware, and the like. Such testing could not focus on the algorithm alone. Approaches presented herein can test an algorithm for resolution of fine features corresponding to both large features at a distance or smaller objects that are closer to the camera, etc. Use of a test target as presented herein can thus provide a determination of the smallest level of detail that can be resolved in stereo output.

As mentioned, other types of targets can be used as well in other embodiments or to test other types of algorithms or systems. Such a pattern can beneficially have features of different sizes so that a size can be determined at which fine features can no longer be determined and/or distinguished. This may include a set of features that decrease in size, whether consistently, incrementally, or according to a determined sizing function. It can be beneficial for the elements or features of the test pattern to be similar in shape and size to eliminate factors due in part to the differences in the features being measured. In other embodiments, this may instead include a number of objects of different sizes, such as illustrated in FIG. 1B for a single element, where different instances can be examined (similar to the set of orbits or concentric circles discussed herein) and the data analyzed to determine a resolution or other such measurement or parameter. Such test patterns can also be generated synthetically to test an algorithm or used to generate a physical test object to test a physical system, among other such options or combinations thereof. In some instances, it may be beneficial to use separate features rather than radial or star patterns, based in part upon the type of image analysis to be performed or types, shapes, or sizes of objects to be analyzed. Other patterns such as—but not limited to—wedges, staircases, or jigsaws may be used in various embodiments, as long as these patterns have one or more features that decrease in size to, for example, a size that is on the order of a pixel or other limit of the imaging system or format. Advantages to a radial pattern include that the pattern is symmetric so that the target information can be obtained concisely from a single stereoscopic image, and that the pattern is isotropic so any differences noticed about the pattern can be an indicator of an issue with the system and/or algorithm being tested. For patterns with multiple features, it can be desirable for the spacings between those features to decrease, or vary in distance, as well as discussed herein. As mentioned, the number of features in such a pattern can vary, with a balance being made between having enough features to provide sufficient data to make accurate measurements, while not wanting to include too many features that would end up wasting computing resources to process or might introduce image artifacts or other potential issues that may negatively impact the accuracy of the measurements. The size of the features can also depend in part upon the range of distance over which the imaging system will need to capture data, in order to account for a full range of potential disparity, or to focus on a specific portion of that range, among other such options.

Figure 7:
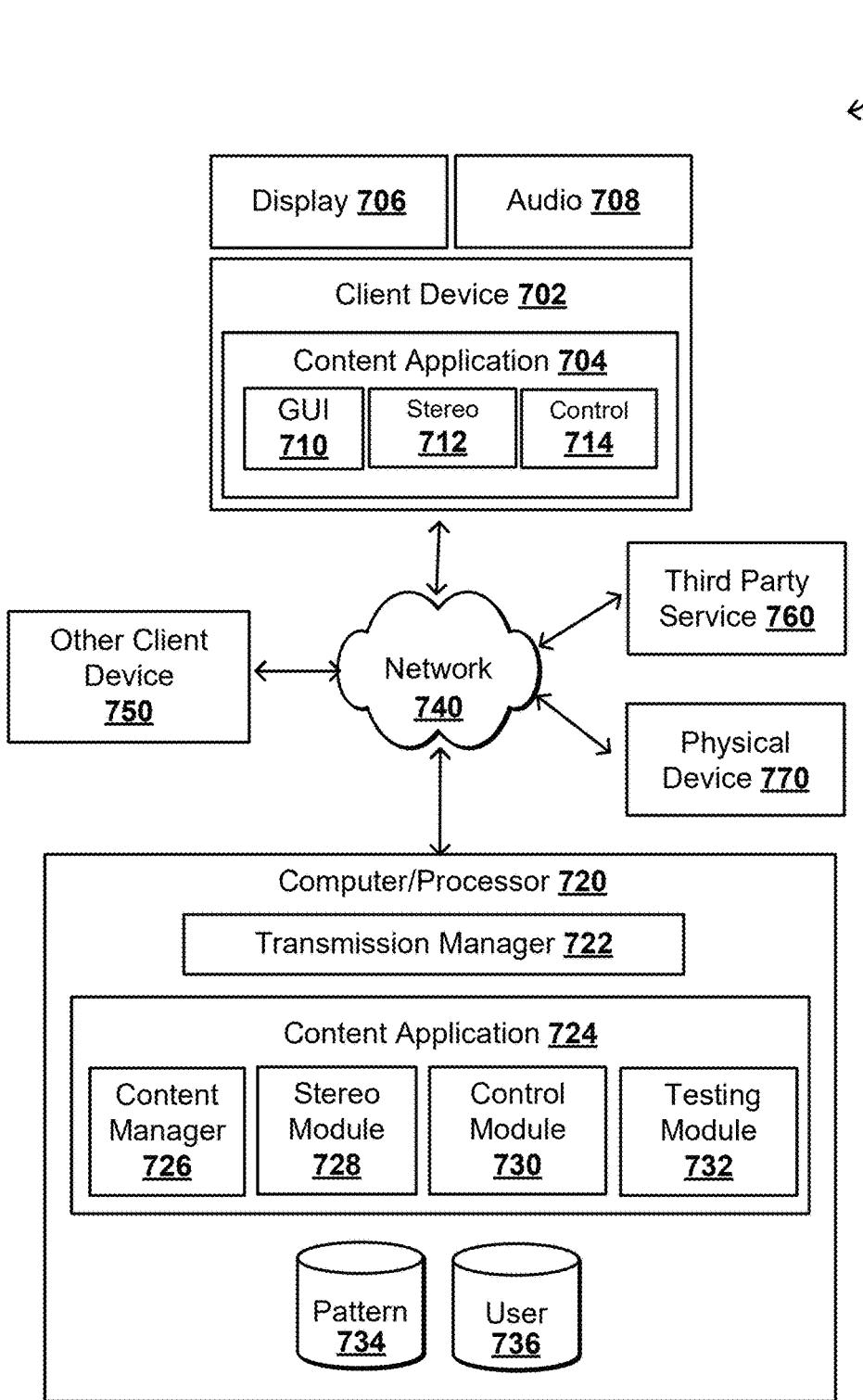
FIG. 7 illustrates components of a distributed system that can be used to generate, test, and use stereoscopic image data, according to at least one embodiment.

FIG. 7 illustrates an example network configuration 700 of components that can be used to implement aspects of various embodiments, such as to provide, generate, modify, encode, process, fuse, and/or transmit generated image data, calculated measurements, or other such content. In at least one embodiment, a client device 702 can generate or receive data for a session using components of a content application 704 on the client device 702 and data stored locally on that client device. In at least one embodiment, a content application 724 executing on a computer or processor 720 (e.g., a cloud server or control system) may initiate a session associated with at least one client device 702 (e.g., a vehicle or robot), as may use a session manager and user data stored in a user database 736, and can cause content such as a stereoscopic test pattern to be selected and/or retrieved from a pattern repository 734 to be used by a testing module 732 to calculate one or more performance metrics for a stereoscopic imaging module 728, which can provide stereoscopic imaging or disparity data to a control module 730 to control a physical device, such as a robot or vehicle, in an environment where the stereoscopic imaging data is to be used to determine appropriate operation. A content manager 726 may work with at these various modules to perform testing and analysis, and potentially instruct any actions to be taken in response to a performance metric failing to satisfy an operational requirements. At least a portion of this data or instructional content can be transmitted to the client device 702 and/or a physical device 770 using an appropriate transmission manager 722 to send by download, streaming, or another such transmission channel. An encoder may be used to encode and/or compress at least some of this data before transmitting to the client device 702. In at least one embodiment, the client device 702 receiving such content can provide this content to a corresponding content application 704, which may also or alternatively include a graphical user interface 710, stereoscopic imaging or analysis module 712, and a control module 714 for use in providing, synthesizing, rendering, compositing, modifying, or using content for presentation, navigation, control, (or other purposes) on or by the client device 702, such as may be transmitted to the physical device 770. In some embodiments, the computer/processor 720 and client device 702 may be able to communicate directly without needing to transmit data over a network 740, in order to avoid issues with latency and availability, etc., A decoder may also be used to decode data received over the network 740 for presentation via client device 702, such as imaging content or performance metrics through a display device 706 and audio, such as corresponding sounds or synthesized speech, through at least one audio playback device 708, such as speakers or headphones. In at least one embodiment, at least some of this content may already be stored on, rendered on, or accessible to client device 702 such that transmission over a network 740 is not required for at least that portion of content, such as where that content (e.g., map data) may have been previously downloaded or stored locally on a hard drive or optical disk. In at least one embodiment, a transmission mechanism such as data streaming can be used to transfer this content from the computer/processor 720, or user database 736, to the client device 702. In at least one embodiment, at least a portion of this content can be obtained, enhanced, and/or streamed from another source, such as a third party service 760 or other client device 750, that may also include a content application for generating, updating, enhancing, or providing map content. In at least one embodiment, portions of this functionality can be performed using multiple computing devices, or multiple processors within one or more computing devices, such as may include a combination of CPUs and GPUs (Graphics Processing Unit).

In at least some of these examples, client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by allowing the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device or may incorporate one or more Virtual Machines (VMs). In at least one embodiment, such a system can be implemented at least partially in a data center or at least partially using cloud computing resources.

Data Center

Figure 8:
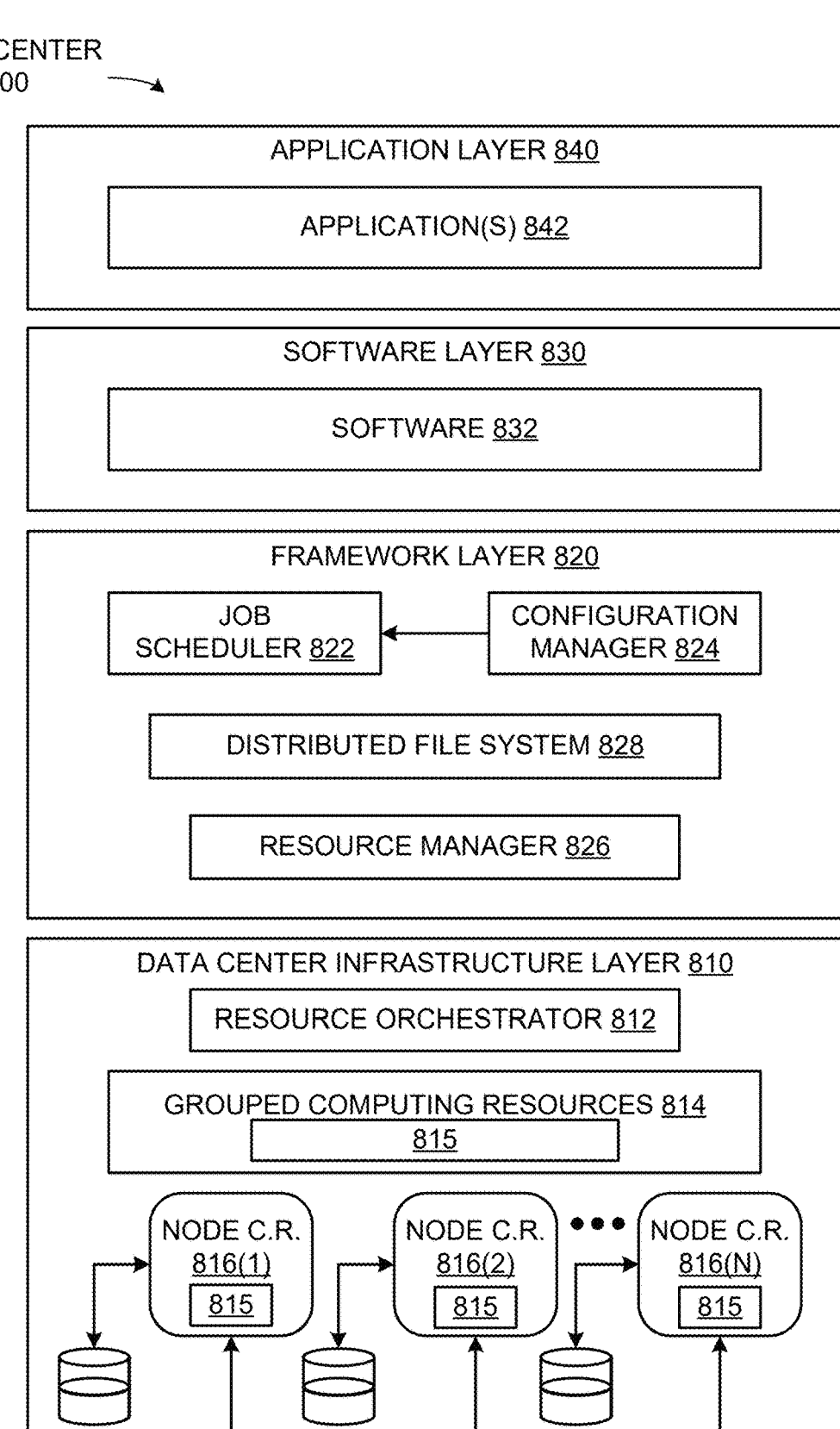
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830 and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents a positive integer (which may be a different integer "N" than used in other figures). In at least one embodiment, node C.R.s 816(1)-816(N) may include, but are not limited to, any number of central processing units ("CPUs") or other processors (including accelerators, field programmable gate arrays (FPGAs), graphics processors, etc.), memory storage devices 818(1)-818(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). In at least one embodiment, separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resources 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. In at least one embodiment, one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 815 are used to perform inferencing and/or training operations associated with one or more embodiments. In at least one embodiment, inference and/or training logic 815 may be used in system FIG. 8 for inferencing or predicting operations based, at least in part, on weight parameters calculated using neural network training operations, neural network functions and/or architectures, or neural network use cases described herein.

Embodiments presented herein can calculate one or more performance characteristics for a stereoscopic imaging assembly or algorithm using a stereoscopic test pattern.

Computer Systems

Figure 9:
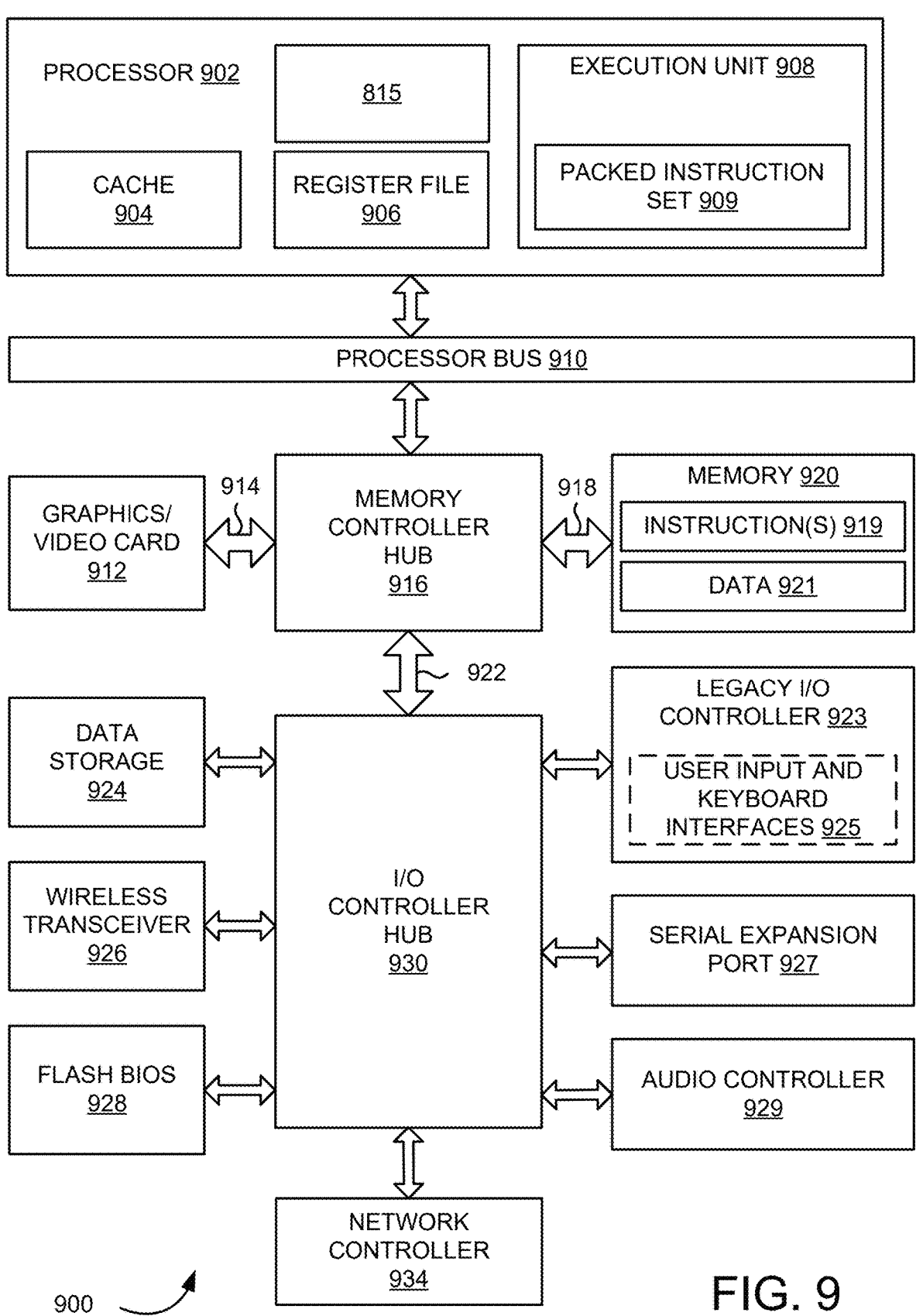
FIG. 9 is a block diagram illustrating a computer system, according to at least one embodiment.

FIG. 9 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment, computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, a register file 906 may store different types of data in various registers including, without limitation, integer registers, floating point registers, status registers, and an instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor, along with associated circuitry to execute instructions, operations used by many multimedia applications may be performed using packed data in processor 902. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be a Dynamic Random Access Memory ("DRAM") device, a Static Random Access Memory ("SRAM") device, a flash memory device, or another memory device. In at least one embodiment, memory 920 may store instruction(s) 919 and/or data 921 represented by data signals that may be executed by processor 902.

In at least one embodiment, a system logic chip may be coupled to processor bus 910 and memory 920. In at least one embodiment, a system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data, and textures. In at least one embodiment, MCH 916 may direct data signals between processor 902, memory 920, and other components in computer system 900 and to bridge data signals between processor bus 910, memory 920, and a system I/O interface 922. In at least one embodiment, a system logic chip may provide a graphics port for coupling to a graphics controller. In at least one embodiment, MCH 916 may be coupled to memory 920 through high bandwidth memory path 918 and a graphics/ video card 912 may be coupled to MCH 916 through an Accelerated Graphics Port ("AGP") interconnect 914.

In at least one embodiment, computer system 900 may use system I/O interface 922 as a proprietary hub interface bus to couple MCH 916 to an I/O controller hub ("ICH") 930. In at least one embodiment, ICH 930 may provide direct connections to some I/O devices via a local I/O bus. In at least one embodiment, a local I/O bus may include, without limitation, a high-speed I/O bus for connecting peripherals to memory 920, a chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as a Universal Serial Bus ("USB") port, and a network controller 934. In at least one embodiment, data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary SoC. In at least one embodiment, devices illustrated in FIG. 9 may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 815 are used to perform inferencing and/or training operations associated with one or more embodiments. In at least one embodiment, inference and/or training logic 815 may be used in system FIG. 9 for inferencing or predicting operations based, at least in part, on weight parameters calculated using neural network training operations, neural network functions and/or architectures, or neural network use cases described herein.

Embodiments presented herein can calculate one or more performance characteristics for a stereoscopic imaging assembly or algorithm using a stereoscopic test pattern.

Figure 10:
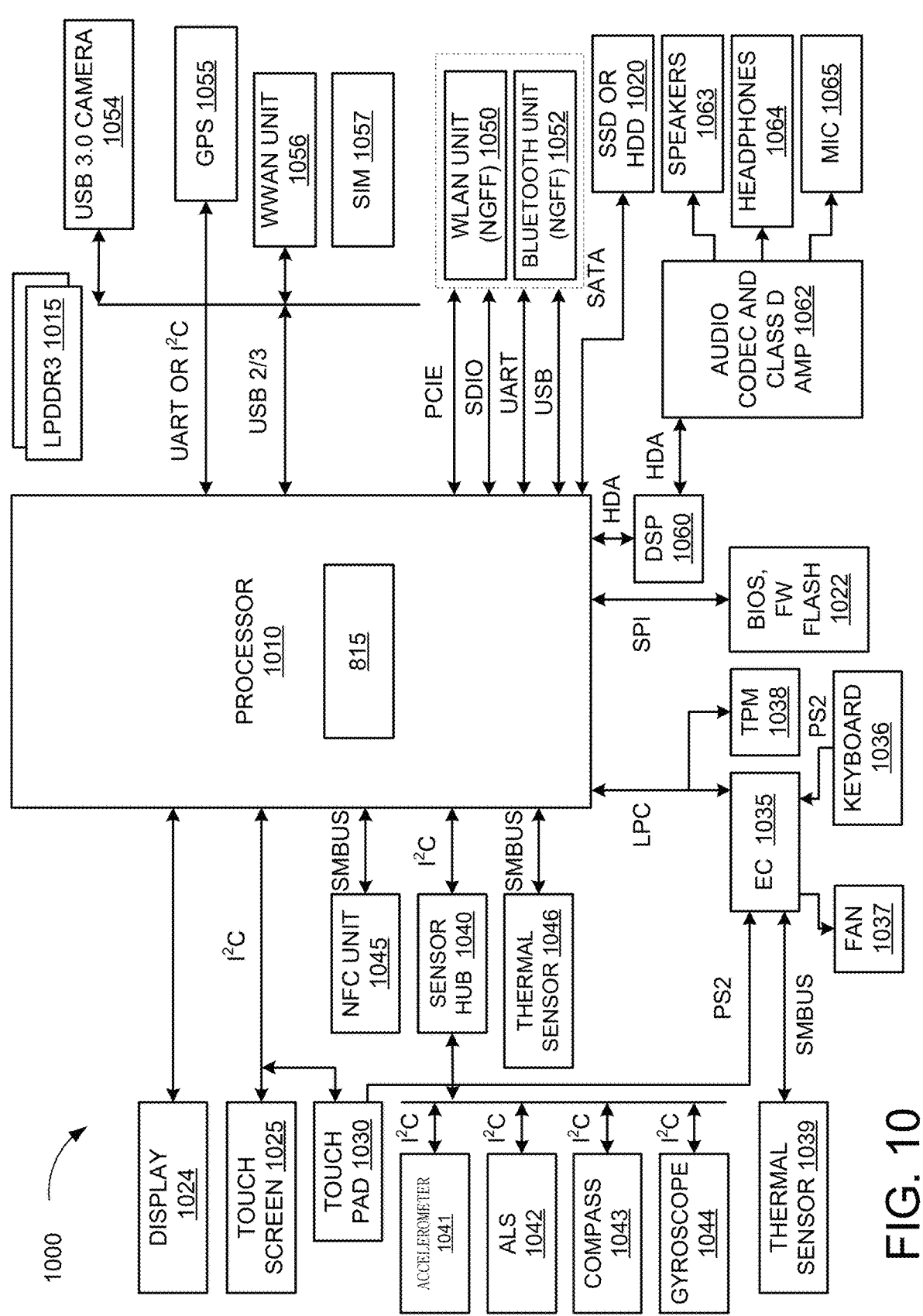
FIG. 10 is a block diagram illustrating a computer system, according to at least one embodiment.

FIG. 10 is a block diagram illustrating an electronic device 1000 for using a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1000 may include, without limitation, processor 1010 communicatively coupled to any suitable number or kind of components, peripherals, modules, or devices. In at least one embodiment, processor 1010 is coupled using a bus or interface, such as a I²C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary SoC. In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) unit 1055, a camera ("USB 3.0 camera") 1054 such as a USB 3.0 camera, and/or a Low Power Double Data Rate ("LPDDR") memory unit ("LPDDR3") 1015 implemented in, for example, an LPDDR3 standard. These components may each be implemented in any suitable manner.

In at least one embodiment, other components may be communicatively coupled to processor 1010 through components described herein. In at least one embodiment, an accelerometer 1041, an ambient light sensor ("ALS") 1042, a compass 1043, and a gyroscope 1044 may be communicatively coupled to sensor hub 1040. In at least one embodiment, a thermal sensor 1039, a fan 1037, a keyboard 1036, and touch pad 1030 may be communicatively coupled to EC 1035. In at least one embodiment, speakers 1063, headphones 1064, and a microphone ("mic") 1065 may be communicatively coupled to an audio unit ("audio codec and class D amp") 1062, which may in turn be communicatively coupled to DSP 1060. In at least one embodiment, audio unit 1062 may include, for example and without limitation, an audio coder/decoder ("codec") and a class D amplifier. In at least one embodiment, a SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 815 are used to perform inferencing and/or training operations associated with one or more embodiments. In at least one embodiment, inference and/or training logic 815 may be used in system FIG. 10 for inferencing or predicting operations based, at least in part, on weight parameters calculated using neural network training operations, neural network functions and/or architectures, or neural network use cases described herein.

Embodiments presented herein can calculate one or more performance characteristics for a stereoscopic imaging assembly or algorithm using a stereoscopic test pattern.

Figure 11:
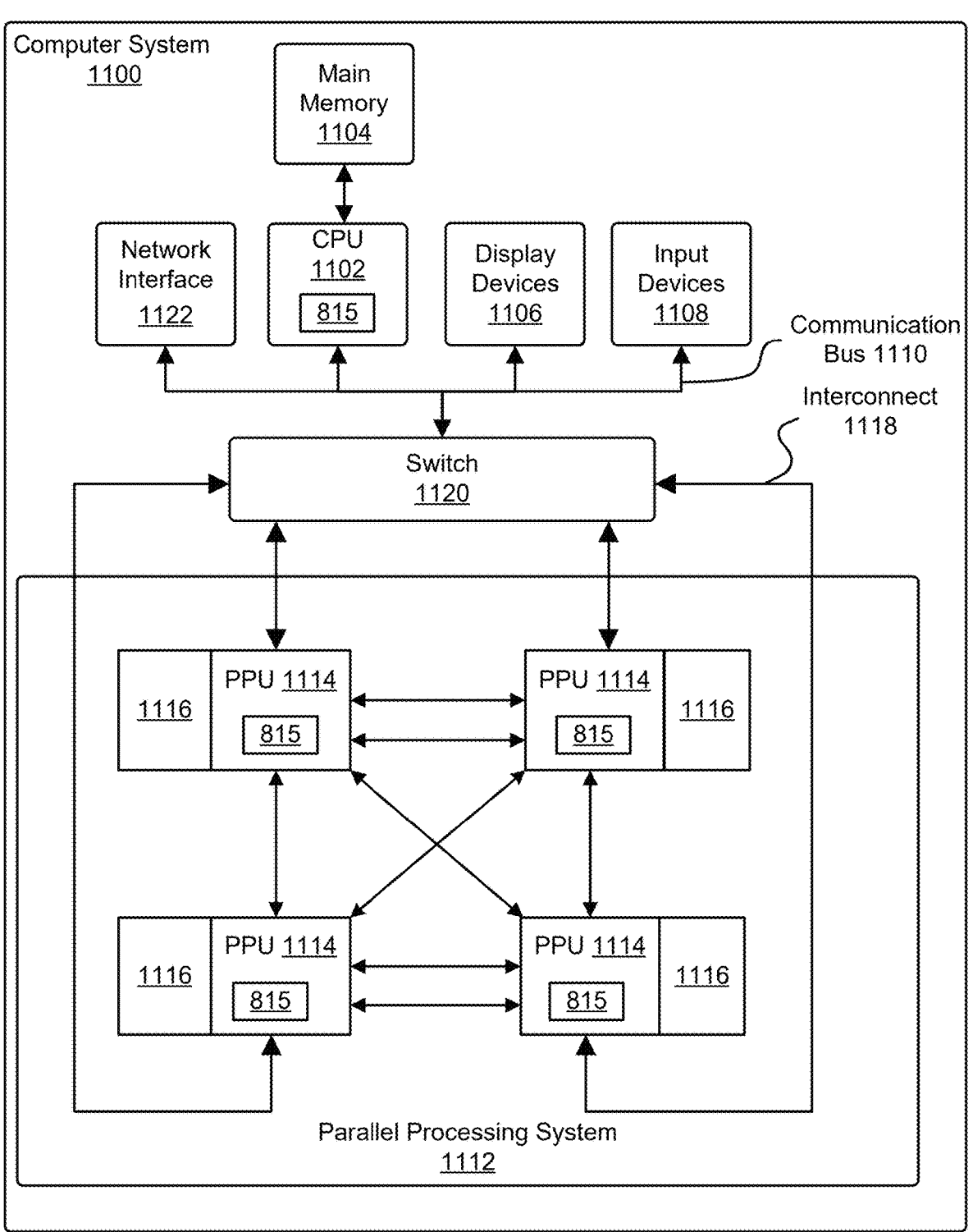
FIG. 11 illustrates a computer system, according to at least one embodiment.

FIG. 11 illustrates a computer system 1100, according to at least one embodiment. In at least one embodiment, computer system 1100 is configured to implement various processes and methods described throughout this disclosure.

In at least one embodiment, computer system 1100 comprises, without limitation, at least one central processing unit ("CPU") 1102 that is connected to a communication bus 1110 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1100 includes, without limitation, a main memory 1104 and control logic (e.g., implemented as hardware, software, or a combination thereof) and data are stored in main memory 1104, which may take form of random access memory ("RAM"). In at least one embodiment, a network interface subsystem ("network interface") 1122 provides an interface to other computing devices and networks for receiving data from and transmitting data to other systems with computer system 1100.

In at least one embodiment, computer system 1100, in at least one embodiment, includes, without limitation, input devices 1108, a parallel processing system 1112, and display devices 1106 that can be implemented using a conventional cathode ray tube ("CRT"), a liquid crystal display ("LCD"), a light emitting diode ("LED") display, a plasma display, or other suitable display technologies. In at least one embodiment, user input is received from input devices 1108 such as keyboard, mouse, touchpad, microphone, etc. In at least one embodiment, each module described herein can be situated on a single semiconductor platform to form a processing system.

Inference and/or training logic 815 are used to perform inferencing and/or training operations associated with one or more embodiments. In at least one embodiment, inference and/or training logic 815 may be used in system FIG. 11 for inferencing or predicting operations based, at least in part, on weight parameters calculated using neural network training operations, neural network functions and/or architectures, or neural network use cases described herein.

Embodiments presented herein can calculate one or more performance characteristics for a stereoscopic imaging assembly or algorithm using a stereoscopic test pattern.

FIG. 12 illustrates a computer system 1200, according to at least one embodiment. In at least one embodiment, computer system 1200 includes, without limitation, a computer 1210 and a USB stick 1220. In at least one embodiment, computer 1210 may include, without limitation, any number and type of processor(s) (not shown) and a memory (not shown). In at least one embodiment, computer 1210 includes, without limitation, a server, a cloud instance, a laptop, and a desktop computer.

In at least one embodiment, USB stick 1220 includes, without limitation, a processing unit 1230, a USB interface 1240, and USB interface logic 1250. In at least one embodiment, processing unit 1230 may be any instruction execution system, apparatus, or device capable of executing instructions. In at least one embodiment, processing unit 1230 may include, without limitation, any number and type of processing cores (not shown). In at least one embodiment, processing unit 1230 comprises an application specific integrated circuit ("ASIC") that is optimized to perform any amount and type of operations associated with machine learning. For instance, in at least one embodiment, processing unit 1230 is a tensor processing unit ("TPC") that is optimized to perform machine learning inference operations. In at least one embodiment, processing unit 1230 is a vision processing unit ("VPU") that is optimized to perform machine vision and machine learning inference operations.

In at least one embodiment, USB interface 1240 may be any type of USB connector or USB socket. For instance, in at least one embodiment, USB interface 1240 is a USB 3.0 Type-C socket for data and power. In at least one embodiment, USB interface 1240 is a USB 3.0 Type-A connector. In at least one embodiment, USB interface logic 1250 may include any amount and type of logic that enables processing unit 1230 to interface with devices (e.g., computer 1210) via USB connector 1240.

Inference and/or training logic 815 are used to perform inferencing and/or training operations associated with one or more embodiments. In at least one embodiment, inference and/or training logic 815 may be used in system FIG. 12 for inferencing or predicting operations based, at least in part, on weight parameters calculated using neural network training operations, neural network functions and/or architectures, or neural network use cases described herein.

Embodiments presented herein can calculate one or more performance characteristics for a stereoscopic imaging assembly or algorithm using a stereoscopic test pattern.

Figure 13:
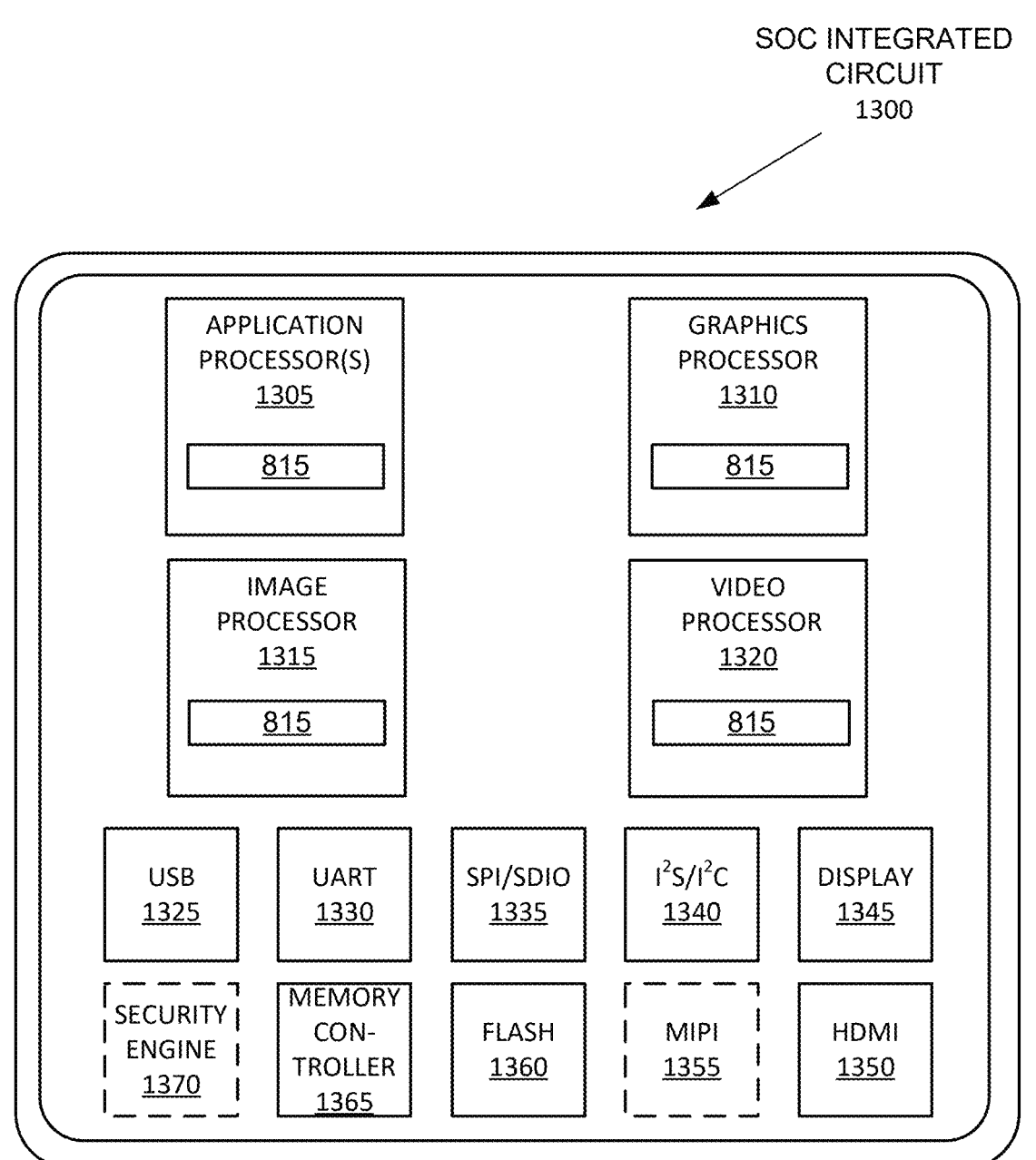
FIG. 13 illustrates exemplary integrated circuits and associated graphics processors, according to at least one embodiment.

FIG. 13 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 13 is a block diagram illustrating an exemplary system-on-a-chip (SOC) integrated circuit 1300 that may be fabricated using one or more IP cores, according to at least one embodiment. In at least one embodiment, SOC integrated circuit 1300 includes one or more application processor(s) 1305 (e.g., CPUs), at least one graphics processor 1310, and may additionally include an image processor 1315 and/or a video processor 1320, any of which may be a modular IP core. In at least one embodiment, SOC integrated circuit 1300 includes peripheral or bus logic including a USB controller 1325, a UART controller 1330, an SPI/SDIO controller 1335, and an I²S/I²C controller 1340. In at least one embodiment, SOC integrated circuit 1300 can include a display device 1345 coupled to one or more of a high-definition multimedia interface (HDMI) controller 1350 and a mobile industry processor interface (MIPI) display interface 1355. In at least one embodiment, storage may be provided by a flash memory subsystem 1360 including flash memory and a flash memory controller. In at least one embodiment, a memory interface may be provided via a memory controller 1365 for access to SDRAM or SRAM memory devices. In at least one embodiment, some integrated circuits additionally include an embedded security engine 1370.

Inference and/or training logic 815 are used to perform inferencing and/or training operations associated with one or more embodiments. In at least one embodiment, inference and/or training logic 815 may be used in SOC integrated circuit 1300 for inferencing or predicting operations based, at least in part, on weight parameters calculated using neural network training operations, neural network functions and/or architectures, or neural network use cases described herein.

Embodiments presented herein can calculate one or more performance characteristics for a stereoscopic imaging assembly or algorithm using a stereoscopic test pattern.

Figure 14A:

FIGS. 14A-14B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 14A-14B are block diagrams illustrating exemplary graphics processors for use within an SoC, according to embodiments described herein. FIG. 14A illustrates an exemplary graphics processor 1410 of a system on a chip integrated circuit that may be fabricated using one or more IP cores, according to at least one embodiment. FIG. 14B illustrates an additional exemplary graphics processor 1440 of a system on a chip integrated circuit that may be fabricated using one or more IP cores, according to at least one embodiment. In at least one embodiment, graphics processor 1410 of FIG. 14A is a low power graphics processor core. In at least one embodiment, graphics processor 1440 of FIG. 14B is a higher performance graphics processor core. In at least one embodiment, each of graphics processors 1410, 1440 can be variants of computer system 1200 of FIG. 12.

In at least one embodiment, graphics processor 1410 includes a vertex processor 1405 and one or more fragment processor(s) 1415A-1415N (e.g., 1415A, 1415B, 1415C, 1415D, through 1415N-1, and 1415N). In at least one embodiment, graphics processor 1410 can execute different shader programs via separate logic, such that vertex processor 1405 is optimized to execute operations for vertex shader programs, while one or more fragment processor(s) 1415A-1415N execute fragment (e.g., pixel) shading operations for fragment or pixel shader programs. In at least one embodiment, vertex processor 1405 performs a vertex processing stage of a 3D graphics pipeline and generates primitives and vertex data. In at least one embodiment, fragment processor(s) 1415A-1415N use primitive and vertex data generated by vertex processor 1405 to produce a framebuffer that is displayed on a display device. In at least one embodiment, fragment processor(s) 1415A-1415N are optimized to execute fragment shader programs as provided for in an OpenGL API, which may be used to perform similar operations as a pixel shader program as provided for in a Direct 3D API.

In at least one embodiment, graphics processor 1410 additionally includes one or more memory management units (MMUs) 1420A-1420B, cache(s) 1425A-1425B, and circuit interconnect(s) 1430A-1430B. In at least one embodiment, one or more MMU(s) 1420A-1420B provide for virtual to physical address mapping for graphics processor 1410, including for vertex processor 1405 and/or fragment processor(s) 1415A-1415N, which may reference vertex or image/texture data stored in memory, in addition to vertex or image/texture data stored in one or more cache(s) 1425A-1425B. In at least one embodiment, one or more MMU(s) 1420A-1420B may be synchronized with other MMUs within a system, including one or more MMUs associated with one or more application processor(s) 1405, image processors 1415, and/or video processors 1420 of FIG. 14A, such that each processor 1405-1420 can participate in a shared or unified virtual memory system. In at least one embodiment, one or more circuit interconnect(s) 1430A-1430B enable graphics processor 1410 to interface with other IP cores within SoC, either via an internal bus of SoC or via a direct connection.

In at least one embodiment, graphics processor 1440 includes one or more shader core(s) 1455A-1455N (e.g., 1455A, 1455B, 1455C, 1455D, 1455E, 1455F, through 1455N-1, and 1455N) as shown in FIG. 14B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1440 includes an inter-core task manager 1445, which acts as a thread dispatcher to dispatch execution threads to one or more shader cores 1455A-1455N and a tiling unit 1458 to accelerate tiling operations for tile-based rendering, in which rendering operations for a scene are subdivided in image space, for example to exploit local spatial coherence within a scene or to optimize use of internal caches.

Embodiments presented herein can calculate one or more performance characteristics for a stereoscopic imaging assembly or algorithm using a stereoscopic test pattern.

Figure 15:
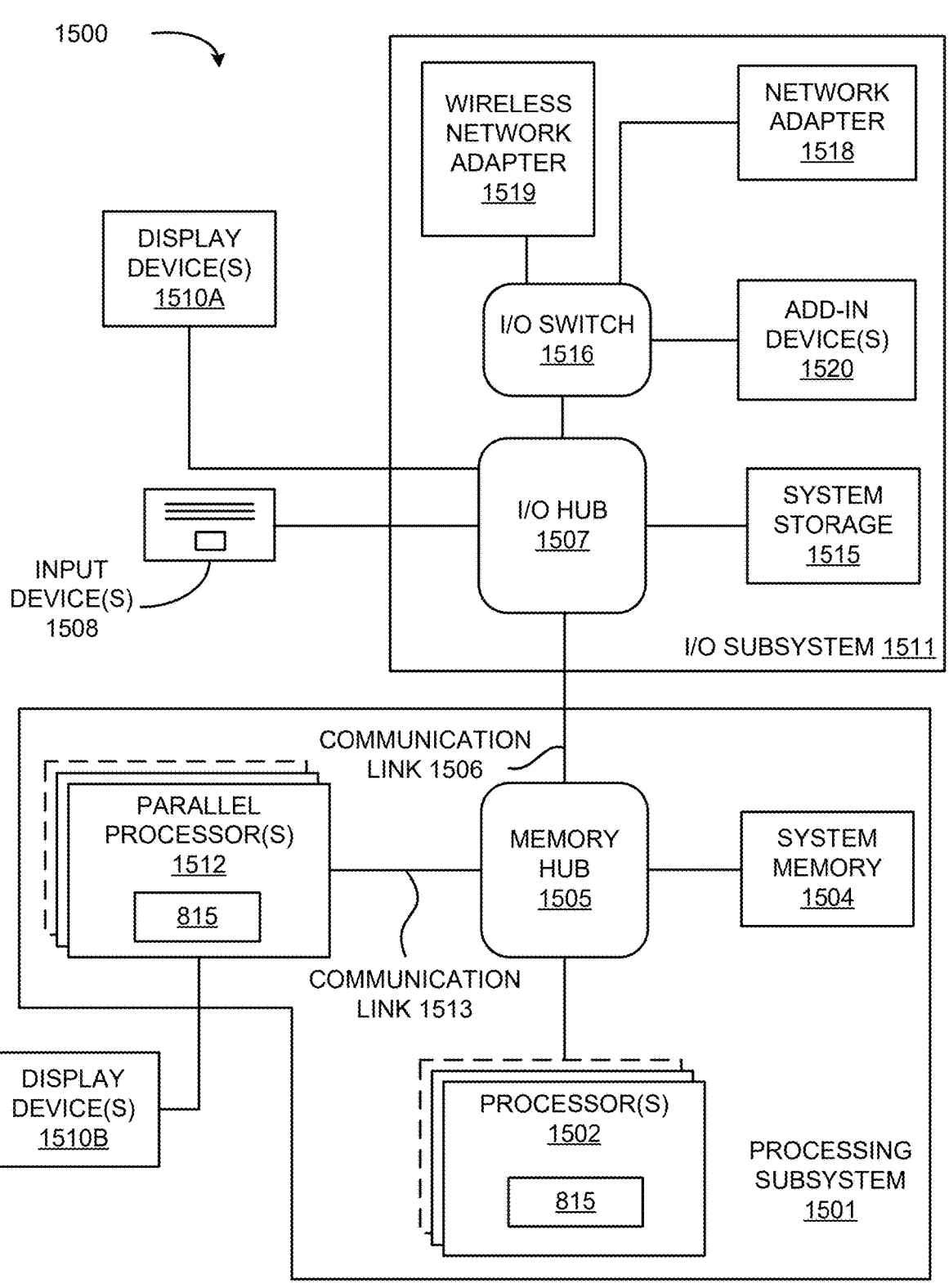
FIG. 15 illustrates a computer system, according to at least one embodiment.

FIG. 15 is a block diagram illustrating a computing system 1500 according to at least one embodiment. In at least one embodiment, computing system 1500 includes a processing subsystem 1501 having one or more processor(s) 1502 and a system memory 1504 communicating via an interconnection path that may include a memory hub 1505. In at least one embodiment, memory hub 1505 may be a separate component within a chipset component or may be integrated within one or more processor(s) 1502. In at least one embodiment, memory hub 1505 couples with an I/O subsystem 1511 via a communication link 1506. In at least one embodiment, I/O subsystem 1511 includes an I/O hub 1507 that can enable computing system 1500 to receive input from one or more input device(s) 1508. In at least one embodiment, I/O hub 1507 can enable a display controller, which may be included in one or more processor(s) 1502, to provide outputs to one or more display device(s) 1510A. In at least one embodiment, one or more display device(s) 1510A coupled with I/O hub 1507 can include a local, internal, or embedded display device.

In at least one embodiment, processing subsystem 1501 includes one or more parallel processor(s) 1512 coupled to memory hub 1505 via a bus or other communication link 1513. In at least one embodiment, communication link 1513 may use one of any number of standards based communication link technologies or protocols, such as but not limited to PCI Express, or may be a vendor-specific communications interface or communications fabric. In at least one embodiment, one or more parallel processor(s) 1512 form a computationally focused parallel or vector processing system that can include a large number of processing cores and/or processing clusters, such as a many-integrated core (MIC) processor. In at least one embodiment, some or all of parallel processor(s) 1512 form a graphics processing subsystem that can output pixels to one of one or more display device(s) 1510A coupled via I/O hub 1507. In at least one embodiment, parallel processor(s) 1512 can also include a display controller and display interface (not shown) to enable a direct connection to one or more display device(s) 1510B. In at least one embodiment, parallel processor(s) 1512 include one or more cores, such as graphics cores 1500 discussed herein.

In at least one embodiment, a system storage unit 1514 can connect to I/O hub 1507 to provide a storage mechanism for computing system 1500. In at least one embodiment, an I/O switch 1516 can be used to provide an interface mechanism to enable connections between I/O hub 1507 and other components, such as a network adapter 1518 and/or wireless network adapter 1519 that may be integrated into platform, and various other devices that can be added via one or more add-in device(s) 1520. In at least one embodiment, network adapter 1518 can be an Ethernet adapter or another wired network adapter. In at least one embodiment, wireless network adapter 1519 can include one or more of a Wi-Fi, Bluetooth, near field communication (NFC), or other network device that includes one or more wireless radios.

In at least one embodiment, computing system 1500 can include other components not explicitly shown, including USB or other port connections, optical storage drives, video capture devices, and like, may also be connected to I/O hub 1507. In at least one embodiment, communication paths interconnecting various components in FIG. 15 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 1512 incorporate circuitry optimized for graphics and video processing, including, for example, video output circuitry, and constitutes a graphics processing unit (GPU), e.g., parallel processor(s) 1512 includes graphics core 1500. In at least one embodiment, parallel processor(s) 1512 incorporate circuitry optimized for general purpose processing. In at least embodiment, components of computing system 1500 may be integrated with one or more other system elements on a single integrated circuit. For example, in at least one embodiment, parallel processor(s) 1512, memory hub 1505, processor(s) 1502, and I/O hub 1507 can be integrated into a system on chip (SoC) integrated circuit. In at least one embodiment, components of computing system 1500 can be integrated into a single package to form a system in package (SIP) configuration. In at least one embodiment, at least a portion of components of computing system 1500 can be integrated into a multi-chip module (MCM), which can be interconnected with other multi-chip modules into a modular computing system.

Inference and/or training logic 815 are used to perform inferencing and/or training operations associated with one or more embodiments. In at least one embodiment, inference and/or training logic 815 may be used in system FIG. 15 for inferencing or predicting operations based, at least in part, on weight parameters calculated using neural network training operations, neural network functions and/or architectures, or neural network use cases described herein.

Embodiments presented herein can calculate one or more performance characteristics for a stereoscopic imaging assembly or algorithm using a stereoscopic test pattern.

Processors

Figure 16A:
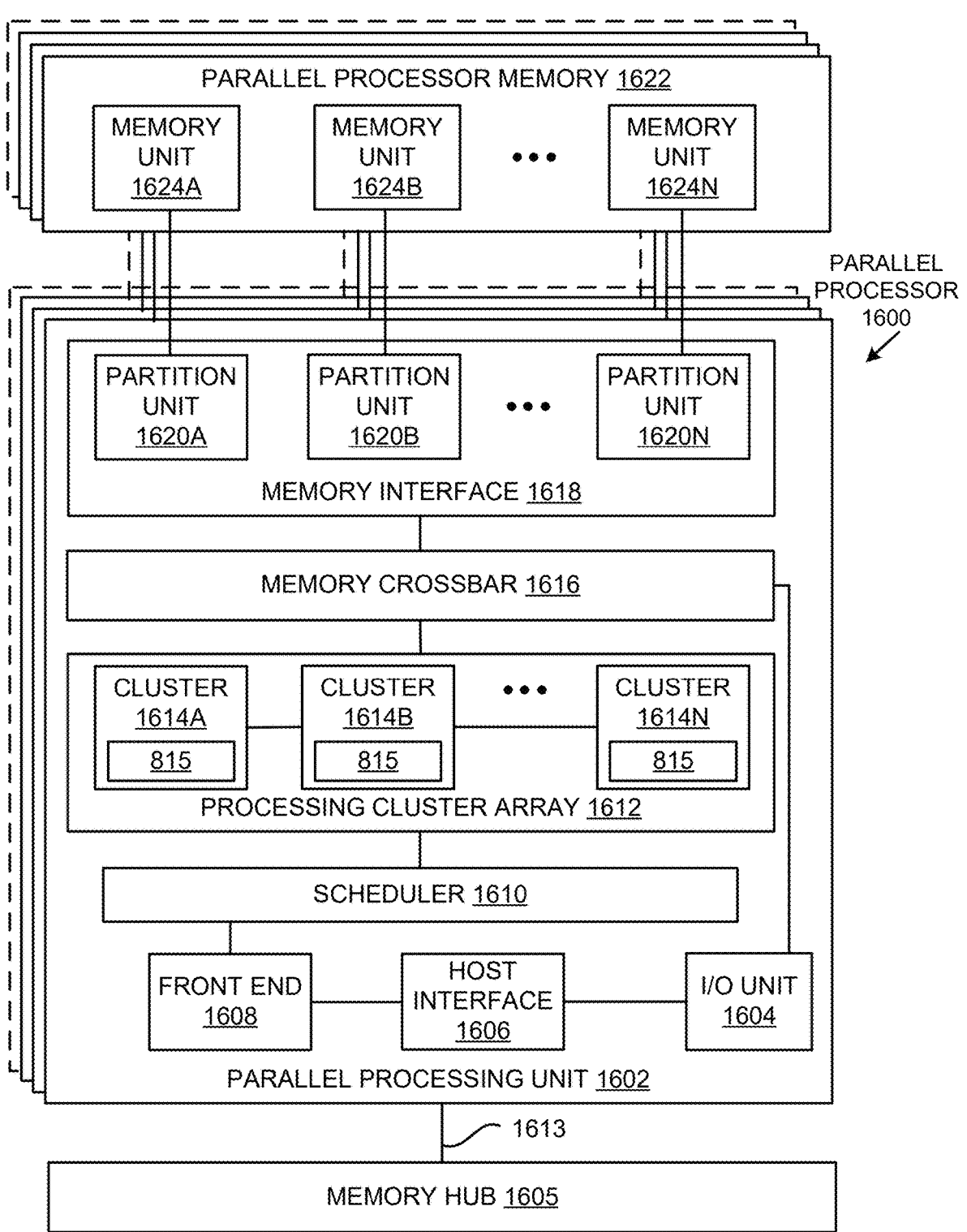
FIG. 16A illustrates a parallel processor, according to at least one embodiment.

FIG. 16A illustrates a parallel processor 1600 according to at least one embodiment. In at least one embodiment, various components of parallel processor 1600 may be implemented using one or more integrated circuit devices, such as programmable processors, application specific integrated circuits (ASICs), or field programmable gate arrays (FPGA). In at least one embodiment, illustrated parallel processor 1600 is a variant of one or more parallel processor (s) 1512 shown in FIG. 15 according to an exemplary embodiment. In at least one embodiment, a parallel processor 1600 includes one or more graphics cores 1500.

In at least one embodiment, parallel processor 1600 includes a parallel processing unit 1602. In at least one embodiment, parallel processing unit 1602 includes an I/O unit 1604 that enables communication with other devices, including other instances of parallel processing unit 1602. In at least one embodiment, I/O unit 1604 may be directly connected to other devices. In at least one embodiment, I/O unit 1604 connects with other devices via use of a hub or switch interface, such as a memory hub 1605. In at least one embodiment, connections between memory hub 1605 and I/O unit 1604 form a communication link 1613. In at least one embodiment, I/O unit 1604 connects with a host interface 1606 and a memory crossbar 1616, where host interface 1606 receives commands directed to performing processing operations and memory crossbar 1616 receives commands directed to performing memory operations.

In at least one embodiment, when host interface 1606 receives a command buffer via I/O unit 1604, host interface 1606 can direct work operations to perform those commands to a front end 1608. In at least one embodiment, front end 1608 couples with a scheduler 1610 (which may be referred to as a sequencer), which is configured to distribute commands or other work items to a processing cluster array 1612. In at least one embodiment, scheduler 1610 ensures that processing cluster array 1612 is properly configured and in a valid state before tasks are distributed to a cluster of processing cluster array 1612. In at least one embodiment, scheduler 1610 is implemented via firmware logic executing on a microcontroller. In at least one embodiment, microcontroller implemented scheduler 1610 is configurable to perform complex scheduling and work distribution operations at coarse and fine granularity, enabling rapid preemption and context switching of threads executing on processing array 1612. In at least one embodiment, host software can prove workloads for scheduling on processing cluster array 1612 via one of multiple graphics processing paths. In at least one embodiment, workloads can then be automatically distributed across processing array cluster 1612 by scheduler 1610 logic within a microcontroller including scheduler 1610.

In at least one embodiment, processing cluster array 1612 can include up to "N" processing clusters (e.g., cluster 1614A, cluster 1614B, through cluster 1614N), where "N" represents a positive integer (which may be a different integer "N" than used in other figures). In at least one embodiment, each cluster 1614A-1614N of processing cluster array 1612 can execute a large number of concurrent threads. In at least one embodiment, scheduler 1610 can allocate work to clusters 1614A-1614N of processing cluster array 1612 using various scheduling and/or work distribution algorithms, which may vary depending on workload arising for each type of program or computation. In at least one embodiment, scheduling can be handled dynamically by scheduler 1610, or can be assisted in part by compiler logic during compilation of program logic configured for execution by processing cluster array 1612. In at least one embodiment, different clusters 1614A-1614N of processing cluster array 1612 can be allocated for processing different types of programs or for performing different types of computations.

In at least one embodiment, processing cluster array 1612 can be configured to perform various types of parallel processing operations. In at least one embodiment, processing cluster array 1612 is configured to perform general-purpose parallel compute operations. For example, in at least one embodiment, processing cluster array 1612 can include logic to execute processing tasks including filtering of video and/or audio data, performing modeling operations, including physics operations, and performing data transformations.

In at least one embodiment, processing cluster array 1612 is configured to perform parallel graphics processing operations. In at least one embodiment, processing cluster array 1612 can include additional logic to support execution of such graphics processing operations, including but not limited to, texture sampling logic to perform texture operations, as well as tessellation logic and other vertex processing logic. In at least one embodiment, processing cluster array 1612 can be configured to execute graphics processing related shader programs such as but not limited to, vertex shaders, tessellation shaders, geometry shaders, and pixel shaders. In at least one embodiment, parallel processing unit 1602 can transfer data from system memory via I/O unit 1604 for processing. In at least one embodiment, during processing, transferred data can be stored to on-chip memory (e.g., parallel processor memory 1622) during processing, then written back to system memory.

In at least one embodiment, when parallel processing unit 1602 is used to perform graphics processing, scheduler 1610 can be configured to divide a processing workload into approximately equal sized tasks, to better enable distribution of graphics processing operations to multiple clusters 1614A-1614N of processing cluster array 1612. In at least one embodiment, portions of processing cluster array 1612 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1614A-1614N may be stored in buffers to allow intermediate data to be transmitted between clusters 1614A-1614N for further processing.

In at least one embodiment, processing cluster array 1612 can receive processing tasks to be executed via scheduler 1610, which receives commands defining processing tasks from front end 1608. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 1610 may be configured to fetch indices corresponding to tasks or may receive indices from front end 1608. In at least one embodiment, front end 1608 can be configured to ensure processing cluster array 1612 is configured to a valid state before a workload specified by incoming command buffers (e.g., batch-buffers, push buffers, etc.) is initiated.

In at least one embodiment, each of one or more instances of parallel processing unit 1602 can couple with a parallel processor memory 1622. In at least one embodiment, parallel processor memory 1622 can be accessed via memory crossbar 1616, which can receive memory requests from processing cluster array 1612 as well as I/O unit 1604. In at least one embodiment, memory crossbar 1616 can access parallel processor memory 1622 via a memory interface 1618. In at least one embodiment, memory interface 1618 can include multiple partition units (e.g., partition unit 1620A, partition unit 1620B, through partition unit 1620N) that can each couple to a portion (e.g., memory unit) of parallel processor memory 1622. In at least one embodiment, a number of partition units 1620A-1620N is configured to be equal to a number of memory units, such that a first partition unit 1620A has a corresponding first memory unit 1624A, a second partition unit 1620B has a corresponding memory unit 1624B, and an N-th partition unit 1620N has a corresponding N-th memory unit 1624N. In at least one embodiment, a number of partition units 1620A-1620N may not be equal to a number of memory units.

In at least one embodiment, memory units 1624A-1624N can include various types of memory devices, including dynamic random access memory (DRAM) or graphics random access memory, such as synchronous graphics random access memory (SGRAM), including graphics double data rate (GDDR) memory. In at least one embodiment, memory units 1624A-1624N may also include 3D stacked memory, including but not limited to high bandwidth memory (HBM), HBM2e, or HDM3. In at least one embodiment, render targets, such as frame buffers or texture maps may be stored across memory units 1624A-1624N, allowing partition units 1620A-1620N to write portions of each render target in parallel to efficiently use available bandwidth of parallel processor memory 1622. In at least one embodiment, a local instance of parallel processor memory 1622 may be excluded in favor of a unified memory design that uses system memory in conjunction with local cache memory.

In at least one embodiment, any one of clusters 1614A-1614N of processing cluster array 1612 can process data that will be written to any of memory units 1624A-1624N within parallel processor memory 1622. In at least one embodiment, memory crossbar 1616 can be configured to transfer an output of each cluster 1614A-1614N to any partition unit 1620A-1620N or to another cluster 1614A-1614N, which can perform additional processing operations on an output. In at least one embodiment, each cluster 1614A-1614N can communicate with memory interface 1618 through memory crossbar 1616 to read from or write to various external memory devices. In at least one embodiment, memory crossbar 1616 has a connection to memory interface 1618 to communicate with I/O unit 1604, as well as a connection to a local instance of parallel processor memory 1622, enabling processing units within different processing clusters 1614A-1614N to communicate with system memory or other memory that is not local to parallel processing unit 1602. In at least one embodiment, memory crossbar 1616 can use virtual channels to separate traffic streams between clusters 1614A-1614N and partition units 1620A-1620N.

In at least one embodiment, multiple instances of parallel processing unit 1602 can be provided on a single add-in card, or multiple add-in cards can be interconnected. In at least one embodiment, different instances of parallel processing unit 1602 can be configured to interoperate even if different instances have different numbers of processing cores, different amounts of local parallel processor memory, and/or other configuration differences. For example, in at least one embodiment, some instances of parallel processing unit 1602 can include higher precision floating point units relative to other instances. In at least one embodiment, systems incorporating one or more instances of parallel processing unit 1602 or parallel processor 1600 can be implemented in a variety of configurations and form factors, including but not limited to desktop, laptop, or handheld personal computers, servers, workstations, game consoles, and/or embedded systems.

Figure 16B:
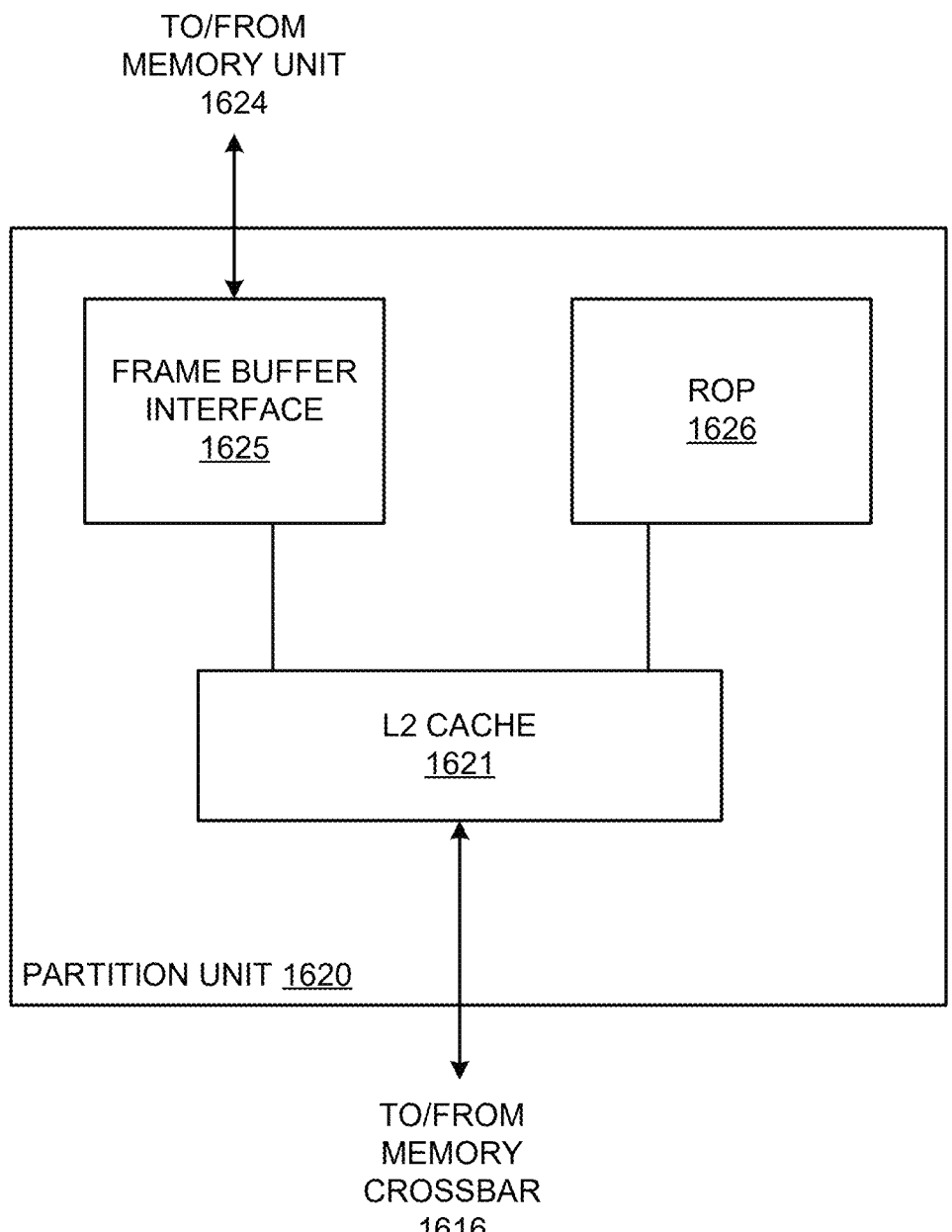
FIG. 16B illustrates a partition unit, according to at least one embodiment.

FIG. 16B is a block diagram of a partition unit 1620 according to at least one embodiment. In at least one embodiment, partition unit 1620 is an instance of one of partition units 1620A-1620N of FIG. 16A. In at least one embodiment, partition unit 1620 includes an L2 cache 1621, a frame buffer interface 1625, and a ROP 1626 (raster operations unit). In at least one embodiment, L2 cache 1621 is a read/write cache that is configured to perform load and store operations received from memory crossbar 1616 and ROP 1626. In at least one embodiment, read misses and urgent write-back requests are output by L2 cache 1621 to frame buffer interface 1625 for processing. In at least one embodiment, updates can also be sent to a frame buffer via frame buffer interface 1625 for processing. In at least one embodiment, frame buffer interface 1625 interfaces with one of memory units in parallel processor memory, such as memory units 1624A-1624N of FIG. 16A (e.g., within parallel processor memory 1622).

In at least one embodiment, ROP 1626 is a processing unit that performs raster operations such as stencil, z test, blending, etc. In at least one embodiment, ROP 1626 then outputs processed graphics data that is stored in graphics memory. In at least one embodiment, ROP 1626 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 1626 can vary based on statistical characteristics of data to be compressed. For example, in at least one embodiment, delta color compression is performed on depth and color data on a per-tile basis.

In at least one embodiment, ROP 1626 is included within each processing cluster (e.g., cluster 1614A-1614N of FIG. 16A) instead of within partition unit 1620. In at least one embodiment, read and write requests for pixel data are transmitted over memory crossbar 1616 instead of pixel fragment data. In at least one embodiment, processed graphics data may be displayed on a display device, such as one of one or more display device(s) 1510 of FIG. 15, routed for further processing by processor(s) 1602, or routed for further processing by one of processing entities within parallel processor 1600 of FIG. 16A.

Figure 17:
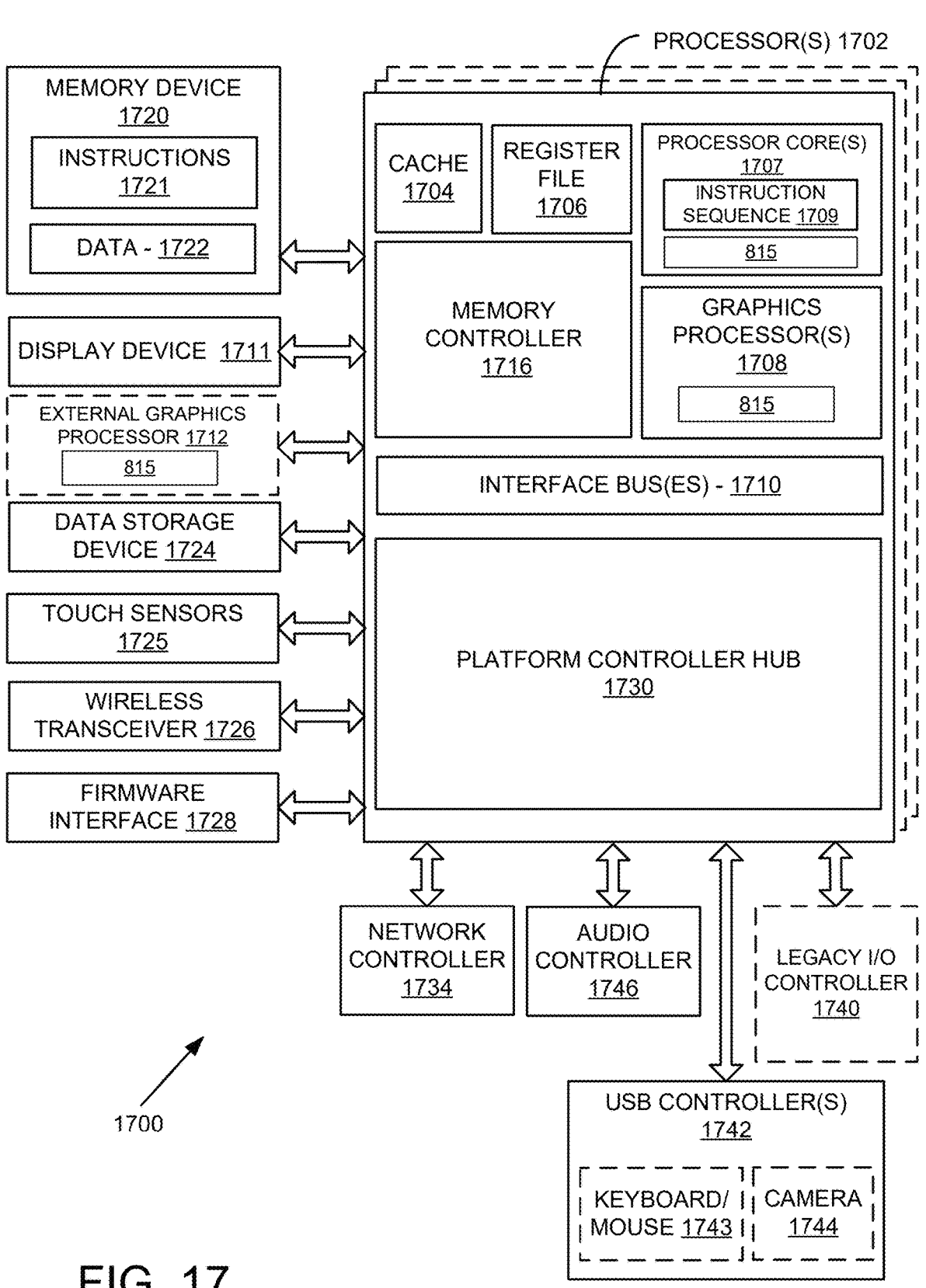
FIG. 17 illustrates at least portions of a graphics processor, according to one or more embodiments.

FIG. 17 is a block diagram of a processing system, according to at least one embodiment. In at least one embodiment, system 1700 includes one or more processor(s) 1702 and one or more graphics processor(s) 1708, and may be a single processor desktop system, a multiprocessor workstation system, or a server system having a large number of processor(s) 1702 or processor core(s) 1707. In at least one embodiment, system 1700 is a processing platform incorporated within a system-on-a-chip (SoC) integrated circuit for use in mobile, handheld, or embedded devices. In at least one embodiment, one or more graphics processor(s) 1708 include one or more graphics cores 1500.

In at least one embodiment, system 1700 can include, or be incorporated within a server-based gaming platform, a game console, including a game and media console, a mobile gaming console, a handheld game console, or an online game console. In at least one embodiment, system 1700 is a mobile phone, a smart phone, a tablet computing device or a mobile Internet device. In at least one embodiment, processing system 1700 can also include, couple with, or be integrated within a wearable device, such as a smart watch wearable device, a smart eyewear device, an augmented reality device, or a virtual reality device. In at least one embodiment, processing system 1700 is a television or set top box device having one or more processor(s) 1702 and a graphical interface generated by one or more graphics processor(s) 1708.

In at least one embodiment, one or more processor(s) 1702 each include one or more processor core(s) 1707 to process instructions which, when executed, perform operations for system and user software. In at least one embodiment, each of one or more processor core(s) 1707 is configured to process a specific instruction sequence 1709. In at least one embodiment, instruction sequence 1709 may facilitate Complex Instruction Set Computing (CISC), Reduced Instruction Set Computing (RISC), or computing via a Very Long Instruction Word (VLIW). In at least one embodiment, processor core(s) 1707 may each process a different instruction sequence 1709, which may include instructions to facilitate emulation of other instruction sequences. In at least one embodiment, processor core(s) 1707 may also include other processing devices, such a Digital Signal Processor (DSP).

In at least one embodiment, processor(s) 1702 includes a cache memory 1704. In at least one embodiment, processor(s) 1702 can have a single internal cache or multiple levels of internal cache. In at least one embodiment, cache memory is shared among various components of processor(s) 1702. In at least one embodiment, processor(s) 1702 also uses an external cache (e.g., a Level-3 (L3) cache or Last Level Cache (LLC)) (not shown), which may be shared among processor core(s) 1707 using known cache coherency techniques. In at least one embodiment, a register file 1706 is additionally included in processor(s) 1702, which may include different types of registers for storing different types of data (e.g., integer registers, floating point registers, status registers, and an instruction pointer register). In at least one embodiment, register file 1706 may include general-purpose registers or other registers.

In at least one embodiment, one or more processor(s) 1702 are coupled with one or more interface bus(es) 1710 to transmit communication signals such as address, data, or control signals between processor(s) 1702 and other components in system 1700. In at least one embodiment, interface bus(es) 1710 can be a processor bus, such as a version of a Direct Media Interface (DMI) bus. In at least one embodiment, interface bus(es) 1710 is not limited to a DMI bus, and may include one or more Peripheral Component Interconnect buses (e.g., PCI, PCI Express), memory busses, or other types of interface busses. In at least one embodiment processor(s) 1702 include an integrated memory controller 1716 and a platform controller hub 1730. In at least one embodiment, memory controller 1716 facilitates communication between a memory device and other components of system 1700, while platform controller hub (PCH) 1730 provides connections to I/O devices via a local I/O bus.

In at least one embodiment, a memory device 1720 can be a dynamic random access memory (DRAM) device, a static random access memory (SRAM) device, flash memory device, phase-change memory device, or some other memory device having suitable performance to serve as process memory. In at least one embodiment, memory device 1720 can operate as system memory for system 1700, to store data 1722 and instructions 1721 for use when one or more processor(s) 1702 executes an application or process. In at least one embodiment, memory controller 1716 also couples with an optional external graphics processor 1712, which may communicate with one or more graphics processor(s) 1708 in processor(s) 1702 to perform graphics and media operations. In at least one embodiment, a display device 1711 can connect to processor(s) 1702. In at least one embodiment, display device 1711 can include one or more of an internal display device, as in a mobile electronic device or a laptop device, or an external display device attached via a display interface (e.g., DisplayPort, etc.). In at least one embodiment, display device 1711 can include a head mounted display (HMD) such as a stereoscopic display device for use in virtual reality (VR) applications or augmented reality (AR) applications.

In at least one embodiment, platform controller hub 1730 enables peripherals to connect to memory device 1720 and processor(s) 1702 via a high-speed I/O bus. In at least one embodiment, I/O peripherals include, but are not limited to, an audio controller 1746, a network controller 1734, a firmware interface 1728, a wireless transceiver 1726, touch sensors 1725, a data storage device 1724 (e.g., hard disk drive, flash memory, etc.). In at least one embodiment, data storage device 1724 can connect via a storage interface (e.g., SATA) or via a peripheral bus, such as a Peripheral Component Interconnect bus (e.g., PCI, PCI Express). In at least one embodiment, touch sensors 1725 can include touch screen sensors, pressure sensors, or fingerprint sensors. In at least one embodiment, wireless transceiver 1726 can be a Wi-Fi transceiver, a Bluetooth transceiver, or a mobile network transceiver such as a 3G, 4G, or Long Term Evolution (LTE) transceiver. In at least one embodiment, firmware interface 1728 enables communication with system firmware, and can be, for example, a unified extensible firmware interface (UEFI). In at least one embodiment, network controller 1734 can enable a network connection to a wired network. In at least one embodiment, a high-performance network controller (not shown) couples with interface bus(es) 1710. In at least one embodiment, audio controller 1746 is a multi-channel high definition audio controller. In at least one embodiment, system 1700 includes an optional legacy I/O controller 1740 for coupling legacy (e.g., Personal System 2 (PS/2)) devices to system 1700. In at least one embodiment, platform controller hub 1730 can also connect to one or more Universal Serial Bus (USB) controller(s) 1742 connect input devices, such as keyboard and mouse 1743 combinations, a camera 1744, or other USB input devices.

In at least one embodiment, an instance of memory controller 1716 and platform controller hub 1730 may be integrated into a discreet external graphics processor, such as external graphics processor 1712. In at least one embodiment, platform controller hub 1730 and/or memory controller 1716 may be external to one or more processor(s) 1702. For example, in at least one embodiment, system 1700 can include an external memory controller 1716 and platform controller hub 1730, which may be configured as a memory controller hub and peripheral controller hub within a system chipset that is in communication with processor(s) 1702.

Embodiments presented herein can calculate one or more performance characteristics for a stereoscopic imaging assembly or algorithm using a stereoscopic test pattern.

Various embodiments can be described by the following clauses:

1. A computer-implemented method, comprising:
generating, using a stereoscopic algorithm, a stereoscopic image of a test pattern, the stereoscopic image generated based at least on a first image and a second image representing at least partially overlapping views of a test pattern, the test pattern including a plurality of features decreasing in at least one of size or separation;
analyzing a representation of the test pattern in the stereoscopic image, at a plurality of locations corresponding to at least one of different sizes or separations of the features, to determine at least one value beyond which the individual features are indistinguishable; and
calculating a resolution limit corresponding to the at least one value beyond which the individual features are indistinguishable.

2. The computer-implemented method of clause 1, further comprising:
synthetically generating the first image and the second image, wherein the resolution limit corresponds to the stereoscopic algorithm independent of aspects of a physical imaging system for which the stereoscopic algorithm is to be used.

3. The computer-implemented method of clause 2, further comprising:
generating a synthetic version of the stereoscopic image based at least on the synthetic first image and the synthetic second image; and
evaluating a performance of the stereoscopic algorithm, in part, by comparing the stereoscopic image generated using the stereoscopic algorithm to the synthetic version of the stereoscopic image.

4. The computer-implemented method of clause 1, further comprising:
capturing the first image and the second image using a stereoscopic imaging assembly including a pair of offset matched cameras, wherein the resolution limit corresponds to the stereoscopic imaging assembly together with the stereoscopic algorithm.

5. The computer-implemented method of clause 4, wherein the test pattern is represented using a physical test object mounted a determined distance from the stereoscopic imaging assembly.

6. The computer-implemented method of clause 1, wherein the test pattern is a radial test pattern where the plurality of features converge toward a center point, the widths and separations of the features decreasing with proximity to the center point.

7. The computer-implemented method of clause 6, wherein the plurality of locations correspond to concentric orbits at different distances from the center point, wherein contrast differences along the circumferences of the concentric orbits represent multiple cycles of the features and feature separations.

8. The computer-implemented method of clause 1, further comprising:
calculating, from the generated stereoscopic image of the test pattern, one or more additional stereoscopic performance metrics.

9. The computer-implemented method of clause 8, further comprising:
comparing at least the resolution limit or the one or more additional stereoscopic performance metrics against one or more performance requirements for an operation to be performed in order to determine whether to use or modify the stereoscopic algorithm or an imaging system using the stereoscopic algorithm.

10. At least one processor comprising:
one or more logic units to:
generate, using a stereoscopic algorithm, a stereoscopic image of a test pattern, the stereoscopic image generated based at least on a first image and a second image representing different views of a test pattern, the test pattern including a plurality of features decreasing in at least one of size or separation;
analyze a representation of the test pattern in the stereoscopic image, at a plurality of locations corresponding to different sizes or separations of the features, to determine at least one value beyond which the individual features are indistinguishable; and
calculate a resolution limit corresponding to the at least one value.

11. The at least one processor of clause 10, wherein the at least one value corresponds to a distance, an amount of disparity, or a number of pixels in the stereoscopic image.

12. The at least one processor of clause 10, wherein the stereoscopic algorithm is to be used for environmental perception for operation of a robotic device, operation of an autonomous machine, operation of a semi-autonomous machine, or navigation of a vehicle.

13. The at least one processor of clause 10, wherein the one or more logic units are further to:
synthetically generate the first image and the second image, wherein the resolution limit corresponds to the stereoscopic algorithm independent of aspects of a physical imaging system for which the stereoscopic algorithm is to be used.

14. The at least one processor of clause 10, wherein the one or more logic units are further to:
cause the first image and the second image to be captured using a stereoscopic imaging assembly including a pair of offset matched image sensors, wherein the resolution limit corresponds to the stereoscopic imaging assembly together with the stereoscopic algorithm.

15. The at least one processor of clause 10, wherein the at least one processor is comprised in at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system for performing generative AI operations using a large language model (LLM);
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for performing generative operations using a language model (LM);

a system for synthetic data generation;

a collaborative content creation platform for 3D assets; or
  a system implemented at least partially using cloud
  computing resources.

16. A system comprising:

one or more processors to determine a stereoscopic resolution limit based at least on analyzing a stereoscopic image of a test pattern to determine a value beyond which features of the pattern are indistinguishable with at least a minimum level of confidence.

17. The system of clause 16, wherein the one or more processors are further to:

synthetically generate a first image and a second image to be used by a stereoscopic algorithm to generate the stereoscopic image, wherein the stereoscopic resolution limit corresponds to the stereoscopic algorithm independent of aspects of a physical imaging system for which the stereoscopic algorithm is to be used.

18. The system of clause 16, wherein the one or more processors are further to:

cause the first image and the second image to be captured using a stereoscopic imaging assembly including a pair of offset matched cameras, wherein the resolution limit corresponds to the stereoscopic imaging assembly together with the stereoscopic algorithm.

19. The system of clause 16, wherein the test pattern is a radial test pattern where the plurality of features converge toward a center point, the widths and separations of the features decreasing with proximity to the center point.

20. The system of clause 16, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system for performing generative AI operations using a large language model (LLM);

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for performing generative operations using a language model (LM);

a system for synthetic data generation;

a collaborative content creation platform for 3D assets; or a system implemented at least partially using cloud computing resources.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over using a conventional central processing unit ("CPU") and bus implementation. In at least one embodiment, various modules may also be situated separately or in various combinations of semiconductor platforms per desires of user.

In at least one embodiment, referring back to FIG. 11, computer programs in form of machine-readable executable code or computer control logic algorithms are stored in main memory 1104 and/or secondary storage. Computer programs, if executed by one or more processors, enable computer system 1100 to perform various functions in accordance with at least one embodiment. In at least one embodiment, main memory 1104, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous FIGS. 1-7 are implemented in context of CPU 1102, parallel processing system 1112, an integrated circuit capable of at least a portion of capabilities of both CPU 1102, parallel processing system 1112, a chipset (e.g., a group of integrated circuits designed to work and sold as a unit for performing related functions, etc.), and/or any suitable combination of integrated circuit(s).

In at least one embodiment, architecture and/or functionality of various previous FIGS. 1-7 are implemented in context of a general computer system, a circuit board system, a game console system dedicated for entertainment purposes, an application-specific system, and more. In at least one embodiment, computer system 1100 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 1112 includes, without limitation, a plurality of parallel processing units ("PPUs") 1114 and associated memories 1116. In at least one embodiment, PPUs 1114 are connected to a host processor or other peripheral devices via an interconnect 1118 and a switch 1120 or multiplexer. In at least one embodiment, parallel processing system 1112 distributes computational tasks across PPUs 1114 which can be parallelizable—for example, as part of distribution of computational tasks across multiple graphics processing unit ("GPU") thread blocks. In at least one embodiment, memory is shared and accessible (e.g., for read and/or write access) across some or all of PPUs 1114, although such shared memory may incur performance penalties relative to use of local memory and registers resident to a PPU 1114. In at least one embodiment, operation of PPUs 1114 is synchronized through use of a command such as _syncthreads( ) wherein all threads in a block (e.g., executed across multiple PPUs 1114) to reach a certain point of execution of code before proceeding.

In at least one embodiment, one or more techniques described herein use a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model uses a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is used to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oncAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is used for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as one VPL, is a library that is used for accelerating video processing in one or more applications. In at least one embodiment, one VPL implements various video decoding, encoding, and processing functions. In at least one embodiment, one VPL implements various functions for media pipelines on CPUs, GPUs, and other accelerators. In at least one embodiment, one VPL implements device discovery and selection in media centric and video analytics workloads. In at least one embodiment, one VPL implements API primitives for zero-copy buffer sharing.

In at least one embodiment, a oneAPI programming model uses a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, any application programming interface (API) described herein is compiled into one or more instructions, operations, or any other signal by a compiler, interpreter, or other software tool. In at least one embodiment, compilation comprises generating one or more machine-executable instructions, operations, or other signals from source code. In at least one embodiment, an API compiled into one or more instructions, operations, or other signals, when performed, causes one or more processors such as graphics processor 1410, graphics processor 1440, graphics core 1500, parallel processor 1700, graphics processor 1900, or any other logic circuit further described herein to perform one or more computing operations.

It should be noted that, while example embodiments described herein may relate to a CUDA programming model, techniques described herein can be used with any suitable programming model, such HIP, oneAPI, and/or variations thereof.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:

generating, using a stereoscopic algorithm, a stereoscopic image of a test pattern, the stereoscopic image generated based at least on a first image and a second image representing at least partially overlapping views of the test pattern, the test pattern including a plurality of features to converge to a single center point by decreasing in at least one of size or separation;

analyzing a representation of the test pattern in the stereoscopic image, at a plurality of locations corresponding to at least one of different sizes or separations of the features, to determine at least one value beyond which at least one of the size or the separation of two or more of individual ones of the features is less than a threshold amount; and calculating a resolution limit corresponding to the at least one value beyond which the individual ones of the features are indistinguishable.

2. The computer-implemented method of claim 1, further comprising:

synthetically generating the first image and the second image, wherein the resolution limit corresponds to the stereoscopic algorithm independent of aspects of a physical imaging system for which the stereoscopic algorithm is to be used.

3. The computer-implemented method of claim 2, further comprising:

generating a synthetic version of the stereoscopic image based at least on the synthetic first image and the synthetic second image; and evaluating a performance of the stereoscopic algorithm, in part, by comparing the stereoscopic image generated using the stereoscopic algorithm to the synthetic version of the stereoscopic image.

4. The computer-implemented method of claim 1, further comprising:

capturing the first image and the second image using a stereoscopic imaging assembly including a pair of offset matched cameras, wherein the resolution limit corresponds to the stereoscopic imaging assembly together with the stereoscopic algorithm.

5. The computer-implemented method of claim 4, wherein the test pattern is represented using a physical test object mounted a determined distance from the stereoscopic imaging assembly.

6. The computer-implemented method of claim 1, wherein the test pattern is a radial test pattern where the plurality of the features converge toward the single center point, wherein widths and separations of the plurality of the features are decreasing with proximity to the single center point.

7. The computer-implemented method of claim 6, wherein the plurality of locations correspond to concentric orbits at different distances from the single center point, wherein contrast differences along circumferences of the concentric orbits represent multiple cycles of the features and feature separations.

8. The computer-implemented method of claim 1, further comprising:

calculating, from the stereoscopic image of the test pattern, one or more additional stereoscopic performance metrics.

9. The computer-implemented method of claim 8, further comprising:

comparing at least the resolution limit or the one or more additional stereoscopic performance metrics against one or more performance requirements for an operation to be performed in order to determine whether to use or modify the stereoscopic algorithm or an imaging system using the stereoscopic algorithm.

10. At least one processor comprising:

one or more logic units to:

generate, using a stereoscopic algorithm, a stereoscopic image of a test pattern, the stereoscopic image generated based at least on a first image and a second image representing different views of the test pattern, the test pattern including a plurality of features to converge to a single center point by decreasing in at least one of size or separation;

analyze a representation of the test pattern in the stereoscopic image, at a plurality of locations corresponding to different sizes or separations of the features, to determine at least one value beyond which at least one of the size or the separation of two or more of individual ones of the features is less than a threshold amount; and calculate a resolution limit corresponding to the at least one value.

11. The at least one processor of claim 10, wherein the at least one value corresponds to a distance, an amount of disparity, or a number of pixels in the stereoscopic image.

12. The at least one processor of claim 10, wherein the stereoscopic algorithm is to be used for environmental perception for operation of a robotic device, operation of an autonomous machine, operation of a semi-autonomous machine, or navigation of a vehicle.

13. The at least one processor of claim 10, wherein the one or more logic units are further to:

synthetically generate the first image and the second image, wherein the resolution limit corresponds to the stereoscopic algorithm independent of aspects of a physical imaging system for which the stereoscopic algorithm is to be used.

14. The at least one processor of claim 10, wherein the one or more logic units are further to:

cause the first image and the second image to be captured using a stereoscopic imaging assembly including a pair of offset matched image sensors, wherein the resolution limit corresponds to the stereoscopic imaging assembly together with the stereoscopic algorithm.

15. The at least one processor of claim 10, wherein the at least one processor is comprised in at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system for performing generative AI operations using a large language model (LLM);

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for performing generative operations using a language model (LM);

a system for synthetic data generation;

a collaborative content creation platform for 3D assets; or a system implemented at least partially using cloud computing resources.

16. A system comprising:

one or more processors to determine a stereoscopic resolution limit based at least on analyzing a stereoscopic image of a test pattern, generated by a stereoscopic algorithm, to determine a value beyond which at least one of a size or a separation of two or more of individual ones of one or more features of the test pattern is less than a threshold amount with at least a minimum level of confidence, wherein the one or more features are to converge to a single center point by decreasing in at least one of the size or the separation.

17. The system of claim 16, wherein the one or more processors are further to:

synthetically generate a first image and a second image to be used by the stereoscopic algorithm to generate the stereoscopic image, wherein the stereoscopic resolution limit corresponds to the stereoscopic algorithm independent of aspects of a physical imaging system for which the stereoscopic algorithm is to be used.

18. The system of claim 17, wherein the one or more processors are further to:

cause the first image and the second image to be captured using a stereoscopic imaging assembly including a pair of offset matched cameras, wherein the resolution limit corresponds to the stereoscopic imaging assembly together with the stereoscopic algorithm.

19. The system of claim 16, wherein the test pattern is a radial test pattern where a plurality of the features converge toward the single center point, wherein widths and separations of the plurality of the features decrease with proximity to the single center point.

20. The system of claim 16, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system for performing generative AI operations using a large language model (LLM);

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for performing generative operations using a language model (LM);

a system for synthetic data generation;

a collaborative content creation platform for 3D assets; or a system implemented at least partially using cloud computing resources.

* * * * *